US012795446B2

(12) United States Patent
Shapin et al.

(10) Patent No.: US 12,795,446 B2
(45) Date of Patent: Nov. 10, 2026

(54) COMMUNICATION TECHNIQUE BETWEEN RADIO DEVICES

(71) Applicant: Telefonaktiebolaget LM Ericsson (publ), Stockholm (SE)

(72) Inventors: Alexey Shapin, Linköping (SE); Shehzad Ali Ashraf, Munich (DE); Torsten Dudda, Wassenberg (DE); Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 229 days.

(21) Appl. No.: 18/690,764

(22) PCT Filed: Sep. 13, 2022

(86) PCT No.: PCT/EP2022/075360

§ 371 (c)(1),
(2) Date: Mar. 11, 2024

(87) PCT Pub. No.: WO2023/036996

PCT Pub. Date: Mar. 16, 2023

(65) Prior Publication Data

US 2024/0397570 A1 Nov. 28, 2024

Related U.S. Application Data

(60) Provisional application No. 63/243,639, filed on Sep. 13, 2021.

(51) Int. Cl.
*H04W 28/08* (2023.01)
*H04W 40/22* (2009.01)
(Continued)

(52) U.S. Cl.
CPC ........... *H04W 28/08* (2013.01); *H04W 40/22* (2013.01); *H04W 76/15* (2018.02); *H04W 92/18* (2013.01)

(58) Field of Classification Search
CPC ..... H04W 28/08; H04W 40/22; H04W 76/15; H04W 92/18; H04W 40/02
See application file for complete search history.

(56) References Cited

U.S. PATENT DOCUMENTS

2020/0037398 A1 * 1/2020 Adachi ................ H04W 16/26
2020/0045674 A1 * 2/2020 Tseng .................... H04W 76/14
(Continued)

OTHER PUBLICATIONS

"3GPP TS 23.501 V17.2.0", 3rd Generation Partnership Project; Technical Specification Group Services and System Aspects; System architecture for the 5G System (5GS); Stage 2 (Release 17), Sep. 2021, 1-542.
(Continued)

*Primary Examiner* — Afshawn M Towfighi
(74) *Attorney, Agent, or Firm* — Murphy, Bilak & Homiller, PLLC

(57) ABSTRACT

A technique for communicating data between a first radio device (100) and a second radio device (110) is provided. A method aspect of the technique performed by the first radio device (100) comprises a step of establishing (302) a first radio communication path between the first radio device (100) and the second radio device (110), wherein the first radio communication path comprises a first radio access network, RAN, link (502) between the first radio device (100) and a first base station (200) of a RAN (500) for serving the first radio device (100). Furthermore, a second radio communication path is established (304) between the first radio device (100) and the second radio device (110), the second radio communication path being different from the first radio communication path, wherein the second radio communication path comprises a first sidelink, SL (504), between the first radio device (100) and the second radio device (110). Moreover, data is communicated (306) between the first radio device (100) and the second radio
(Continued)

device (110) using selectively at least one of the first radio communication path and the second radio communication path depending on at least one criterion.

21 Claims, 9 Drawing Sheets

(51) Int. Cl.
*H04W 76/15* (2018.01)
*H04W 92/18* (2009.01)

(56) References Cited

U.S. PATENT DOCUMENTS

| | | | | |
|---|---|---|---|---|
| 2020/0107236 | A1* | 4/2020 | Tseng | H04W 4/40 |
| 2020/0260463 | A1* | 8/2020 | Lovlekar | H04W 72/1215 |
| 2021/0315057 | A1* | 10/2021 | Baek | H04W 76/10 |
| 2021/0392628 | A1* | 12/2021 | Wu | H04W 48/10 |
| 2024/0107603 | A1* | 3/2024 | Wu | H04B 17/336 |

OTHER PUBLICATIONS

"3GPP TS 38.321 V16.5.0", 3rd Generation Partnership Project; Technical Specification Group Radio Access Network; NR; Medium Access Control (MAC) protocol specification (Release 16), Jun. 2021, 1-157.

"3rd Generation Partnership Project; Technical Specification Group Services and System Aspects; Proximity-based Services (ProSe); Security aspects (Release 16)", 3GPP TS 33.303 V16.0.0, Jul. 2020, 90 pages.

"3rd Generation Partnership Project; Technical Specification Group Services and System Aspects; Proximity-based services (ProSe); Stage 2 (Release 16)", 3GPP TS 23.303 V16.0.0, Jul. 2020, 130 pages.

"Revised WID: Enhanced Industrial Internet of Things (IOT) and ultra-reliable and low latency communication (URLLC) support for NR", 3GPP TSG RAN Meeting #88e, RP-201310, Electronic meeting, Revision of RP-193233, Jun. 29-Jul. 3, 2020, 1-6.

3GPP, "3rd Generation Partnership Project; Technical Specification Group Radio Access Network; NR; Radio Resource Control (RRC) protocol specification (Release 16)", 3GPP TS 38.331 V16.5.0, Jun. 2021, 1-959.

Kousaridas, Apostolos , et al., "Multi-Connectivity Management for 5G V2X Communication", 2019 IEEE 30th Annual International Symposium on Personal, Indoor and Mobile Radio Communications (PIMRC): Track 3: Mobile and Wireless Networks, Sep. 8, 2019, 7 pages.

Lianghai, Ji , et al., "Applying Multiradio Access Technologies for Reliability Enhancement in Vehicle-to-Everything Communication", IEEE Access, vol. 6, May 16, 2018, 16 pages.

Unknown, Author , "New WID on NR sidelink enhancement", 3GPP TSG RAN Meeting #86, RP-193231, (revision of RP-193134), Sitges, Spain, Dec. 9-12, 2019, 1-6.

* cited by examiner

500

800

900

COMMUNICATION TECHNIQUE BETWEEN RADIO DEVICES

TECHNICAL FIELD

The present disclosure relates to a technique for communicating data between radio devices. More specifically, and without limitation, methods and devices are provided for communicating data and controlling such a data communication between a first radio device and a second radio device.

BACKGROUND

The Third Generation Partnership Project (3GPP) defined sidelinks (SLs) for Long Term Evolution (LTE) to support proximity services (ProSe) in Releases 12 and 13, targeting public safety use cases (e.g., first responders) as well as a small subset of commercial use cases (e.g., discovery). The main novelty of ProSe was the introduction of device-to-device (D2D) communications using a sidelink (SL) interface. For Releases 14 and 15, major changes were introduced to the LTE SL framework with the aim of supporting vehicle-to-everything or vehicle-to-anything (V2X) communications, wherein V2X collectively denotes communication between vehicle to any other endpoint (e.g., a vehicle, a pedestrian, etc.). This feature targeted mostly basic V2X use cases such as day-1 safety, etc.

During Release 16, 3GPP worked on specifying the SL interface for the Fifth Generation (5G) New Radio (NR). The SL of NR (NR SL) in Release 16 mainly targets advanced V2X services, which can be categorized into four use case groups: vehicles platooning, extended sensors, advanced driving, and remote driving. The advanced V2X services require a new SL in order to meet the stringent requirements in terms of latency and reliability. The NR sidelink is designed to provide higher system capacity and better coverage, and to allow for an easy extension to support the future development of further advanced V2X services and other related services.

Given the targeted V2X services by NR SL, it is commonly recognized that groupcast/multicast and unicast transmissions are desired, in which the intended receiver of a message consists of only a subset of the vehicles in proximity to the transmitter (groupcast) or of a single vehicle (unicast). For example, in the platooning service there are certain messages that are only of interest to the members of the platoon, making the members of the platoon a natural groupcast. In another example, the see-through use case most likely involves only a pair of vehicles, for which unicast transmissions naturally fit. Therefore, NR sidelink not only supports broadcast as in LTE sidelink, but also groupcast and unicast transmissions. Like in LTE sidelink, the NR sidelink is designed in such a way that its operation is possible with and without network coverage and with varying degrees of interaction between radio devices (e.g., user equipments or UEs) and the network (NW or RAN for radio access NW), including support for standalone or network-less operation.

In Release 17, 3GPP is working on multiple enhancements for the sidelink with the aim of extending the support for V2X and to cover other use cases (UCs) such as public safety (cf. e.g., the 3GPP document RP-193231). Among these, improving the performance of power limited UEs (e.g., pedestrian UEs, first responder UEs, etc.) and improving the performance using resource coordination are considered critical. Furthermore, SL based relaying solutions (both layer 2 and layer 3) are also being specified that includes both UE-to-network relay and UE-to-UE relays.

For Release 18, high level discussions regarding non-V2X vertical use cases for sidelink have just begun. While the details are too early to discuss, some examples of use cases that involve sidelink or some form of direct-link between devices are: Industrial IoT, drones and SL in unlicensed spectrum.

For critical services, it is important to fulfill reliability and latency requirements in the radio link to guarantee a required quality of service (Qos).

SUMMARY

Accordingly, there is a need for a communication technique between radio devices that takes quality requirements of data to be communicated into account.

As to a first method aspect, a method according to claim 1 or a method of communicating data between a first radio device and a second radio device is provided. The method is performed by the first radio device and comprises or initiates the step of establishing a first radio communication path between the first radio device and the second radio device. The first radio communication path comprises a first radio access network (RAN) link between the first radio device and a first base station of a RAN for serving the first radio device. The method further comprises or initiates the step of establishing a second radio communication path between the first radio device and the second radio device, the second radio communication path being different from the first radio communication path. The second radio communication path comprises a first sidelink (SL) between the first radio device and the second radio device. The method further comprises or initiates the step of communicating data between the first radio device and the second radio device using selectively at least one of the first radio communication path and the second radio communication path depending on at least one criterion.

In any aspect, the technique may be implemented as a method of adaptive path selection.

By using selectively the first or the second radio communication path depending on at least one criterion, at least some embodiments can increase reliability and/or reduce latency.

Same or further embodiments may fulfill (e.g., for critical services) reliability and/or latency requirements in the selected path (i.e., the selected radio link), e.g., to guarantee a required quality of service (Qos). On one hand, the SL (e.g., 5G NR sidelink transmissions) may be considered not fast or reliable enough for such type of services. Thus, for transmitting the data from the first radio device (e.g., a UE1) to the second radio device (e.g., a UE2), it may be preferred to relay data via the first base station (e.g., a next generation node B or gNB) using uplink (UL) and downlink (DL) in the RAN links, so that a scheduler at the base station can have full control and guarantee the required QoS. However, on the other hand, relaying the data via the base station (e.g., gNB) may be not the most efficient or fastest method since one packet is transmitted twice in the radio interface (once in UL and once in DL). Nevertheless, there may be a situation and/or a time period when there is a very stable and/or reliable first SL (i.e., sidelink connection between UE1 and UE2, especially when UE1 and UE2 are in close proximity). In such cases, the second radio communication path (i.e., the first SL) can be used according to the communicating step (e.g., as a primary path for data transmission), while the first radio communication path (e.g., the gNB relay) may be used as an alternative path when the first SL becomes unreliable.

The technique may be applied in 3GPP and/or many different radio access technologies (RATs), e.g., to selectively use (e.g., switch) the radio communication paths between SL (i.e., the first SL) and Uu (i.e., the first RAN link). Herein, switch between direct path (i.e., a UE directly connected to the network via Uu) and indirect path (i.e., a UE is indirectly connected to the network through relay UE via SL) are considered.

The path switching (i.e., the selecting of the paths) may or may not mean that the first radio device switches the path when the other path is dropped (or due to a connection failure that occurred). Alternatively or in addition, the selecting of the paths) may or may not mean related to service continuity (such as make-before-break).

Preferably, the technique is used (e.g., according to an enhanced 3GPP specification) as a mechanism to dynamically route (e.g., re-route) traffic (i.e., the data and/or the corresponding data packets), which may or may not belong to the same QoS flow) from the first radio device (e.g., UE1) to the second radio device (e.g., UE2), and/or vice versa, by selecting between the first radio communication path (e.g., one or more paths via the base station, optionally gNB) and the second radio communication path (e.g., one or more paths including a the first SL). For example, the technique may be used for per-packet path selection.

The first radio communication path and the second radio communication path being different may mean that the first radio communication path and the second radio communication path are disjoint. For example, the first radio device and the second radio device may be the only nodes that the first radio communication path and the second radio communication path have in common. In other words, the first radio communication path and the second radio communication path may have no intermediate nodes in common.

Using selectively at least one of the first radio communication path and the second radio communication path depending on at least one criterion may mean using selectively the first radio communication path or the second radio communication path depending on at least one criterion.

The communicating of the data may comprise transmitting the data (or at least a transmitted part of the data) from the first radio device to the second radio device using selectively at least one of the first radio communication path and the second radio communication path depending on at least one criterion. Alternatively or in addition, the communicating of the data may comprise receiving the data (or at least a received part of the data) from the second radio device at the first radio device using selectively at least one of the first radio communication path and the second radio communication path depending on at least one criterion.

Communicating the data using selectively at least one of the first radio communication path and the second radio communication path depending on the at least one criterion may comprise a step of selecting, depending on the at least one criterion, at least one of the first radio communication path and the second radio communication path for the communicating of the data.

The communicating of the data may be briefly referred to as data communication. The data communication may selectively use either the first radio communication path or the second radio communication path. Which one of the first radio communication path and the second radio communication path is used for the data communication may depend on the at least one criterion.

The first RAN link may be or may comprise a radio link between the first radio device and the first base station. Alternatively or in addition, the first RAN link may comprise a Uu interface between the first radio device and the first base station. Alternatively or in addition, the first RAN link may comprise an uplink and/or a downlink between the first radio device and the first base station.

The sidelink may be or may comprise a (e.g., direct) radio link between the first radio device and the second radio device. Alternatively or in addition, the sidelink may comprise a PC5 interface between the first radio device and the second radio device.

The first radio communication path and second radio communication path may be briefly referred to as a first path and a second path, respectively. Alternatively or in addition, establishing the first radio communication path and establishing the second radio communication path may also be referred to as establishing a radio connection via the first radio communication and establishing a radio connection via the second radio communication, respectively.

Reference to the "first" base station may or may not imply the presence of a second base station. Alternatively or in addition, reference to the "first" RAN link may or may not imply the presence of a second RAN link. Alternatively or in addition, reference to the "first" SL may or may not imply the presence of a second SL.

Establishing the second radio communication path may comprise transmitting a discovery message for establishing the first SL.

The establishing of the first radio communication path (e.g., according to the first method aspect) may comprise establishing at least two first radio communication paths between the first radio device and the second radio device. Each of the at least two first radio communication paths may comprise a first RAN link between the first radio device and the first base station.

Optionally, the establishing of the second radio communication path may comprise establishing at least two second radio communication paths between the first radio device and the second radio device. Each of the at least two second radio communication paths may comprise a first SL between the first radio device and the second radio device.

The communicating of the data between the first radio device and the second radio device (e.g., according to the first method aspect) may use selectively at least one of the at least two first radio communication path and the second radio communication path depending on at least one criterion.

The first radio communication path, or at least one or each of the least two first radio communication paths, (e.g., according to the first method aspect) may further comprise a second RAN link between the first base station and the second radio device.

For example, the serving base station may serve both the first radio device and the second radio device.

The second RAN link may be or may comprise a radio link between the second radio device and the first base station. Alternatively or in addition, the second RAN link may comprise a Uu interface between the second radio device and the first base station. Alternatively or in addition, the second RAN link may comprise an uplink and/or a downlink between the second radio device and the first base station.

The first radio communication path, or at least one or each of the least two first radio communication paths, (e.g., according to the first method aspect) may further comprise a backhaul link between the first base station and a second base of the RAN, and a second RAN link between the second base station and the second radio device for serving the second radio device.

The backhaul link may comprise an X2 or Xn interface.

The second RAN link may be or may comprise a radio link between the second radio device and the second base station. Alternatively or in addition, the second RAN link may comprise a Uu interface between the second radio device and the second base station. Alternatively or in addition, the second RAN link may comprise an uplink and/or a downlink between the second radio device and the second base station.

The first radio communication path, or at least one or each of the least two first radio communication paths (e.g., according to the first method aspect) may further comprise a second RAN link between the first base station and a relay radio device, and a second SL between the relay radio device and the second radio device.

The second RAN link may be or may comprise a radio link between the relay radio device and the first base station. Alternatively or in addition, the second RAN link may comprise a Uu interface between the relay radio device and the first base station. Alternatively or in addition, the second RAN link may comprise an uplink and/or a downlink between the relay radio device and the first base station.

The first radio communication path, or at least one or each of the least two first radio communication paths (e.g., according to the first method aspect) may further comprise a backhaul link between the first base station and a second base of the RAN, and a second RAN link between the second base station and a relay radio device, and a second SL between the relay radio device and the second radio device.

The second RAN link may be or may comprise a radio link between the relay radio device and the second base station. Alternatively or in addition, the second RAN link may comprise a Uu interface between the relay radio device and the second base station. Alternatively or in addition, the second RAN link may comprise an uplink and/or a downlink between the relay radio device and the second base station.

The at least one or each of the first SL and the second SL (e.g., according to the first method aspect) may further comprise at least two SL-based hobs.

At least one or each of the first RAN link, the second RAN link, the first SL, and the second SL may further comprise at least one SL-based relay radio device. For example, the first RAN link, the second RAN link, the first SL, and the second SL may comprise two or more hops. At least one or each of the two or more hops may comprise a SL.

The method (e.g., according to the first method aspect) may further comprise or initiate the step of receiving a configuration message from the first base station, the configuration message being indicative of the at least one criterion.

The configuration message may be indicative of one or each of the at least one criterion.

The first radio device and the second radio device (e.g., according to the first method aspect) may be in dual connectivity (DC). A first connection of the DC may use the first radio communication path and a second connection of the DC may use the second radio communication path.

The first radio device (e.g., according to the first method aspect) may be configured with a split bearer for the communicating of the data between the first radio device and the second radio device.

The first radio communication path (e.g., according to the first method aspect) may be associated with a first radio link control (RLC) entity of the first radio device, and the second radio communication path is associated with a second radio link control (RLC) entity of the first radio device.

The communicating of the data (e.g., according to the first method aspect) may use the first radio communication path or the second radio communication path selectively per packet of the data.

The packets of the data may be briefly referred to as data packets.

In other words, different data packets may be communicated using a different one of the first radio communication path and the second radio communication path.

The first radio device (e.g., according to the first method aspect) may comprise a packet data convergence protocol (PDCP) entity. The communicating of the data may comprise routing, at the PDCP entity, packets of the data exclusively on the first radio communication path or on the second radio communication path depending on the at least one criterion.

The communicating of the data (e.g., according to the first method aspect) may comprise at least one of duplicating packets of the data, optionally at a PDCP entity of the first radio device according to the at least one criterion; and transmitting duplicates of the packets of the data on the first radio communication path and the second radio communication path to the second radio device according to the at least one criterion.

Performing at least one of the duplicating of the packets and the transmitting of the duplicates of the packets may be referred to as packet duplication. Duplicating the packets at the PDCP entity may also be referred to as PDCP duplication.

The first radio device may perform packet duplication when transmitting packets of the data (according to the communicating of the data) and/or if scheduling grants for both the first RAN link and the first SL are available.

The communicating of the data (e.g., according to the first method aspect) may comprise at least one of transmitting duplicates of the packets of the data on the first radio communication path and the second radio communication path until a first trigger event according to the at least one criterion occurs; routing packets of the data exclusively on the second radio communication path until a first trigger event according to the at least one criterion occurs; and routing packets of the data exclusively on the first radio communication path after the first trigger event according to the at least one criterion occurred.

The first radio communication path may be a default (e.g., a prioritized or primary) radio communication path for the first radio device.

The communicating of the data (e.g., according to the first method aspect) may comprise at least one of transmitting duplicates of the packets of the data on the first radio communication path and the second radio communication path until a second trigger event according to the at least one criterion occurs; routing packets of the data exclusively on the first radio communication path until a second trigger event according to the at least one criterion occurs; and routing packets of the data exclusively on the second radio communication path after the second trigger event according to the at least one criterion occurred.

The second radio communication path may be a default (e.g., a prioritized or primary) radio communication path for the first radio device.

Transmitting (e.g., routing) packets of the data (e.g., exclusively) on the first radio communication path may comprise transmitting a scheduling request (SR) and/or a buffer status report (BSR) to the first base station for requesting radio resources of the first RAN link between the first radio device and the first base station (e.g., an uplink).

Transmitting (e.g., routing) packets of the data (e.g., exclusively) on the second radio communication path may comprise transmitting a scheduling request (SR) and/or a buffer status report (BSR) to the first base station for requesting SL radio resources of the first SL link (e.g., a resource pool or a configured grant). Alternatively or in addition, transmitting (e.g., routing) packets of the data (e.g., exclusively) on the second radio communication path may comprise transmitting a scheduling request (SR) and/or a buffer status report (BSR) to second radio device on a physical SL control channel (PSCCH).

The method (e.g., according to the first method aspect) wherein a first timer may be initiated when the packets become available for transmission at the first radio device. At least one of the first trigger event and the second trigger event may comprise expiry of the first timer before the packets are successfully transmitted from the first radio device to the second radio device.

When the first radio device fails to (e.g., successfully) transmit a packet of the data to the second radio device within a predefined time (i.e., the duration of the first timer) elapsed since the packet became available for transmission, the first radio device may select the successful one (when performing packet duplication on the radio communication paths) or another one (when transmitting exclusively on one of the radio communication paths) of the radio communication paths.

The first timer (e.g., according to the first method aspect) may be configured per packet of the data.

The expiry of the first timer (e.g., according to the first method aspect) may depend on or correspond to a packet delay budget (PDB) associated with the packets of the data, or a survival time associated with the packets of the data, or a latency requirement associated with the packets of the data.

The expiry of the first timer may correspond to a maximum time available for the transmission. The expiry and/or the latency requirement and/or PDB may be depend on or correspond to a quality of service (QOS) requirement of the packets of the data.

The method (e.g., according to the first method aspect) may further comprise or initiate the step of transmitting a control message to the first base station, the control message being indicative of at least one of initiating of the first timer, expiry of the first timer, the first trigger event, and the second trigger event.

Responsive to the control message being indicative of the first trigger event, the first base station may refrain from scheduling the first radio device (e.g., refrain from transmitting a scheduling grant to the first radio device) for (e.g., SL) radio resources of the SL of the second radio communication path. Alternatively or in addition, responsive to the control message being indicative the first trigger event, the first base station may start scheduling the first radio device (e.g., start transmitting scheduling grants or a configured grant to the first radio device) for (e.g., UL) radio resources of the first RAN link of the first radio communication path.

Alternatively or in addition, responsive to the control message being indicative of the second trigger event, the first base station may refrain from scheduling the first radio device (e.g., refrain from transmitting a scheduling grant to the first radio device) for (e.g., UL) radio resources for the first RAN link. Alternatively or in addition, responsive to the control message being indicative of the second trigger event, the first base station may start scheduling the first radio device (e.g., start transmitting scheduling grants or a configured grant to the first radio device) for (e.g., SL) radio resources of the first SL.

The method (e.g., according to the first method aspect), wherein a second timer may be initiated by the first trigger event, the second trigger event comprising expiry of the second timer, optionally without occurrence of a failed transmission of the packets from the first radio device to the second radio device using the first radio communication path. Alternatively or in addition, a second timer may be initiated by the second trigger event, the first trigger event comprising expiry of the second timer, optionally without occurrence of a failed transmission of the packets from the first radio device to the second radio device using the second radio communication path.

The second timer may expire after a predefined number of seconds. After expiry of the second timer, the first radio device may end a non-default operation and/or return to the default radio communication path.

The second timer may be running as long as each packet is successfully transmitted from the first radio device to the second radio device.

The method (e.g., according to the first method aspect), wherein a counter may be initiated by the first trigger event and incremented for each packet transmitted from the first radio device to the second radio device using the first radio communication path, the second trigger event comprising the counter being equal to or greater than a predefined number of transmissions. Alternatively or in addition, a counter may be initiated by the second trigger event and incremented for each packet transmitted from the first radio device to the second radio device using the second radio communication path, the first trigger event comprising the counter being equal to or greater than a predefined number of transmissions.

After the counter is equal to or greater than the predefined number of (e.g., successful) transmissions, the first radio device may end a non-default operation and/or return to the default radio communication path.

The counter may be incremented for each packet successfully transmitted from the first radio device to the second radio device.

Herein, "predefined" (e.g., a parameter or a criterion being predefined) may encompass being configured (e.g., by the first base station) or preconfigured (e.g., hardcoded). A parameter or criterion being configured may comprise (e.g., the first base station) transmitting a configuration message to the first radio device, the configuration message being of the configured value. Alternatively or in addition, a parameter or criterion being preconfigured may comprise that the parameter or criterion is specified in a technical specification, e.g., for a radio access technology (RAT) used for at least one of the RAN, the first RAN link, the serving of the first radio device, the first base station of a RAN when serving the first radio device, the second RAN link, the first SL, the second SL, and the backhaul link.

The method (e.g., according to the first method aspect) may further comprise or initiate the step of receiving a configuration message from the first base station, the configuration message being indicative of the at least one criterion.

The at least one criterion (e.g., according to the first method aspect) may comprise at least one of a requirement on time synchronization accuracy of the data or packets of the data, optionally a requirement for time-sensitive networking (TSN) synchronization; a QoS requirement of the data or packets of the data; a PDB or survival time of the data or packets of the data; a threshold for a traffic load on the first radio communication path, wherein the second trigger event comprises exceeding of the threshold; a threshold for a traffic load on the second radio communication path, wherein the first trigger event comprises exceeding of the threshold; a traffic congestion on the first radio communication path, wherein the second trigger event comprises measuring the traffic congestion on the first radio communication path; a traffic congestion on the second radio communication path, wherein the first trigger event comprises measuring the traffic congestion on the second radio communication path; a comparison of traffic load between the first radio communication path and the second radio communication path, wherein the first trigger event comprises the traffic load of the second radio communication path exceeding the traffic load of the first radio communication path by a predefined hysteresis value and/or the second trigger event comprises the traffic load of the first radio communication path exceeding the traffic load of the second radio communication path by a predefined hysteresis value; a comparison of signal quality between the first radio communication path and the second radio communication path, wherein the first trigger event comprises the signal quality of the first radio communication path exceeding the signal quality of the second radio communication path by a predefined hysteresis value and/or the second trigger event comprises the signal quality of the second radio communication path exceeding the signal quality of the first radio communication path by a predefined hysteresis value; and a comparison of a time synchronization accuracy between the first radio communication path and the second radio communication path, wherein the first trigger event comprises the time synchronization accuracy of the first radio communication path exceeding time synchronization accuracy of the second radio communication path by a predefined hysteresis value and/or the second trigger event comprises the time synchronization accuracy of the second radio communication path exceeding the time synchronization accuracy of the first radio communication path by a predefined hysteresis value.

The signal quality may be compared and/or measured (e.g., at the first radio device, optionally on the first RAN link for the first radio communication path and/or on the first SL for the second radio communication path) in terms of at least one of radio signal strength, received signal strength indicator (RSSI), reference signal received power (RSRP), and reference signal received quality (RSRQ).

The traffic congestion may be measured on the respective radio communication path if a listen-before-talk procedure fails, e.g., consecutively a predefined number of times.

The method (e.g., according to the first method aspect) may further comprise or initiate the step of receiving a configuration message from the first base station, the configuration message being indicative of a default radio communication path among the first radio communication path and the second radio communication path.

The configuration message may be indicative of the default radio communication path among the at least two first radio communication paths and the second radio communication path.

The first radio device (e.g., according to the first method aspect) may start the communicating of the data using a default radio communication path, optionally default radio communication path configured by the first base station.

The default radio communication path may be predefined (e.g., configured or preconfigured).

The first radio device (e.g., according to the first method aspect) may start the communicating of the data by selecting randomly one of the first radio communication path and the second radio communication path.

Herein, referring to the data or packets of the data (e.g., for a QoS requirement and/or a requirement for the time synchronization accuracy) may encompass referring to a data radio bearer (DRB) of the data and/or a QoS flow of the data and/or packet data unit (PDU) session of the data.

As to a second method aspect, a method of controlling communicating of data between a first radio device and a second radio device is provided. The method is performed by a first base station of a radio access network (RAN) serving the first radio device. The method comprises or initiates the step of controlling establishing a first radio communication path between the first radio device and the second radio device. The first radio communication path comprises a first RAN link between the first radio device and the first base station. The method further comprises or initiates the step of controlling establishing a second radio communication path between the first radio device and the second radio device, the second radio communication path being different from the first radio communication path. The second radio communication path comprises a first sidelink (SL), between the first radio device and the second radio device. The method further comprises or initiates the step of controlling communicating data between the first radio device and the second radio device using selectively at least one of the first radio communication path and the second radio communication path depending on at least one criterion.

The second method aspect may further comprise any feature and/or any step disclosed in the context of the first method aspect, or a feature and/or step corresponding thereto, e.g., a receiver counterpart to a transmitter feature or step.

At least some method embodiments of any method aspect can select the relay radio device and/or selectively perform a SL connection establishment, which ensures that the traffic relayed by the relay radio device is given the appropriate QoS treatment (e.g., the QoS of the traffic).

The controlling of the communicating of the data may comprise transmitting and/or receiving any one of the control messages and configuration messages disclosed herein (e.g., in the context of the first method aspect). Alternatively or in addition, the controlling of the communicating of the data may comprise scheduling the first radio device and/or the second radio device (e.g., with radio resources) for the communicating of the data on the respective radio communication path.

As to another aspect, a computer program product is provided. The computer program product comprises program code portions for performing any one of the steps of the first and/or second method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a first radio device for communicating data between the first radio device and a second radio device is provided. The first radio device comprises memory operable to store instructions and processing circuitry operable to execute the instructions, such that the first radio device is operable to establish a first radio communication path between the first radio device and the second radio device. The first radio communication path comprises a first radio access network (RAN) link between the first radio device and a first base station of a RAN for serving the first radio device. The first radio device is further operable to establish a second radio communication path between the first radio device and the second radio device, the second radio communication path being different from the first radio communication path. The second radio communication path comprises a first sidelink (SL), between the first radio device and the second radio device. The first radio device is further operable to communicate data between the first radio device and the second radio device using selectively at least one of the first radio communication path and the second radio communication path depending on at least one criterion.

The radio device (e.g., according to the first device aspect) may further comprise the features or further operable to perform any one of the steps of the first method aspect.

As to another first device aspect, a first radio device for communicating data between the first radio device and a second radio device is provided. The first radio device is configured to establish a first radio communication path between the first radio device and the second radio device. The first radio communication path comprises a first radio access network (RAN) link between the first radio device and a first base station of a RAN for serving the first radio device. The first radio device is further configured to establish a second radio communication path between the first radio device and the second radio device, the second radio communication path being different from the first radio communication path. The second radio communication path comprises a first sidelink (SL), between the first radio device and the second radio device. The first radio device is further configured to communicate data between the first radio device and the second radio device using selectively at least one of the first radio communication path and the second radio communication path depending on at least one criterion.

The radio device (e.g., according to the first device aspect) may further comprise the features or further configured to perform any one of the steps of the first method aspect.

As to a second device aspect, a first base station for controlling communicating data between a first radio device and a second radio device is provided. The first base station comprises memory operable to store instructions and processing circuitry operable to execute the instructions, such that the first base station is operable to control establishing a first radio communication path between the first radio device and the second radio device. The first radio communication path comprises a first radio access network (RAN) link between the first radio device and the first base station of a RAN for serving the first radio device. The first base station is further operable to control establishing a second radio communication path between the first radio device and the second radio device, the second radio communication path being different from the first radio communication path. The second radio communication path comprises a first sidelink (SL), between the first radio device and the second radio device. The first base station is further operable to control communicating data between the first radio device and the second radio device using selectively at least one of the first radio communication path and the second radio communication path depending on at least one criterion.

The first base station (e.g., according to the second device aspect) may further comprise the features or further operable to perform any one of the steps of the second method aspect.

As to another second device aspect, a first base station for controlling communicating data between a first radio device and a second radio device is provided. The first base station is configured to control establishing a first radio communication path between the first radio device and the second radio device. The first radio communication path comprises a first radio access network (RAN) link between the first radio device and the first base station of a RAN for serving the first radio device. The first base station is further configured to control establishing a second radio communication path between the first radio device and the second radio device, the second radio communication path being different from the first radio communication path. The second radio communication path comprises a first sidelink (SL), between the first radio device and the second radio device. The first base station is further configured to control communicating data between the first radio device and the second radio device using selectively at least one of the first radio communication path and the second radio communication path depending on at least one criterion.

The first base station (e.g., according to the second device aspect) may further comprise the features or may be further operable to perform any one of the steps of the second method aspect.

As to a system aspect, a communication system including a host computer is provided. The host computer m comprises processing circuitry configured to provide user data; and a communication interface configured to forward user data to a cellular radio network or ad hoc radio network for transmission to a user equipment (UE). The UE comprises a radio interface and processing circuitry, the processing circuitry of the UE being configured to execute any one of the steps of the first method aspect.

The communication system (e.g., according to the system aspect) may further include the UE.

The radio network (e.g., according to the system aspect) may further comprise a base station, or a relay radio device functioning as a gateway, which is configured to communicate with the UE.

The base station, or the relay radio device functioning as a gateway, may comprise processing circuitry, which is configured to execute any of the steps of the second method aspect.

The processing circuitry of the host computer (e.g., according to the system aspect) may be configured to execute a host application, thereby providing the user data. The processing circuitry of the UE may be configured to execute a client application associated with the host application.

Without limitation, for example in a 3GPP implementation, any "radio device" may be a user equipment (UE). Any one of the method aspects may be embodied by a method of selecting a radio communication path with a desired (e.g., required and/or guaranteed) QoS. The desired QoS level may be exchanged (i.e., by means of a control message) during the establishing of the first and/or second radio communication path.

The technique may be applied in the context of 3GPP New Radio (NR). Unlike a SL according to 3GPP LTE, a SL according to 3GPP NR can provide a wide range of Qos levels. Therefore, at least some embodiments of the technique can ensure that the radio communication path appropriate for the QoS of the data is selected.

The technique may be implemented in accordance with a 3GPP specification, e.g., for 3GPP release 17. The technique may be implemented for 3GPP LTE or 3GPP NR according to a modification of the 3GPP document TS 23.303, version 16.0.0 or for 3GPP NR according to a modification of the 3GPP document TS 33.303, version 16.0.0.

The QoS indicated in the at least one control message may replace or modify existing rules for bearer selection. For example, for traffic that is unicasted in the UL, the relay radio device may use UL traffic flow templates (TFTs) to select UL bearers of an evolved packet system (EPS) for relayed UL packets independently from a ProSe Per Packet Priority applied over PC5 by remote radio devices, e.g., according to 3GPP document TS 23.303, version 16.0.0, clause 5.4.6.2. The at least one control message may comprise a control message transmitted from the relay radio device to the remote radio device, which is indicative of the QoS used according to the TFTs. Alternatively or in addition, the at least one control message may comprise a control message transmitted from the remote radio device to the relay radio device to, which is indicative of the QoS that overrules, e.g., a TFT-based selection.

For traffic that is unicasted in the DL, the relay radio device may map a QoS class identifier (QCI) of the EPS bearer into a ProSe Per-Packet Priority value to be applied for the DL relayed unicast packets over the interface PC5, e.g., according to 3GPP document TS 23.303, version 16.0.0, clause 5.4.6.2. The mapping rules may be provisioned in the relay radio device. The at least one control message may comprise a control message transmitted from the relay radio device to the remote radio device, which is indicative of the QoS used according to the QCI. Alternatively or in addition, the at least one control message may comprise a control message transmitted from the remote radio device to the relay radio device to, which is indicative of the QoS that overrules the QCI of the EPS bearer, e.g., by requesting a further EPS bearer.

In any radio access technology (RAT), the technique may be implemented for SL relay selection. The SL may be implemented using proximity services (ProSe), e.g. according to a 3GPP specification.

Any radio device may be a user equipment (UE), e.g., according to a 3GPP specification. The relay radio device may also be referred to as a relay UE (or briefly: relay). Alternatively or in addition, the remote radio device may also be referred to as a remote UE. Alternatively or in addition, the further radio device may also be referred to as a further UE.

The first radio device and the RAN may be wirelessly connected in an uplink (UL) and/or a downlink (DL) through a Uu interface. Alternatively or in addition, the (e.g., first) SL may enable a direct radio communication between proximal radio devices, e.g., the first radio device and the second radio device, optionally using a PC5 interface. Services provided using the SL or the PC5 interface may be referred to as proximity services (ProSe). Any radio device (e.g., the first radio device and/or the second radio device and/or the relay radio device and/or the further radio device) supporting a SL may be referred to as ProSe-enabled radio device. The relay radio device may also be referred to as ProSe UE-to-Network Relay.

The first radio device and/or second radio device and/or the relay radio device and/or the RAN and/or the further remote radio device may form, or may be part of, a radio network, e.g., according to the Third Generation Partnership Project (3GPP) or according to the standard family IEEE 802.11 (Wi-Fi).

The first method aspect and the second method aspect may be performed by one or more embodiments of the first radio device and the RAN (e.g., the first base station), respectively.

The RAN may comprise one or more base stations, e.g., performing the second method aspect. Alternatively or in addition, the radio network may be a vehicular, ad hoc and/or mesh network comprising two or more radio devices, e.g., acting as the remote radio device and/or the relay radio device and/or the further remote radio device.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more base stations.

The remote radio device may be wirelessly connected or connectable (e.g., according to a radio resource control, RRC, state or active mode) with the relay radio device and, optionally, at least one base station of the RAN. The relay radio device may be wirelessly connected or connectable (e.g., according to a radio resource control, RRC, state or active mode) with at least one base station of the RAN and/or the further remote radio device. Furthermore, the relay radio device may be wirelessly connected or connectable (e.g., according to 3GPP ProSe) with the remote radio device.

The base station may encompass any station that is configured to provide radio access to any of the radio devices. The base stations may also be referred to as cell, transmission and reception point (TRP), radio access node or access point (AP). The base station and/or the relay radio device may provide a data link to a host computer providing the user data to the remote radio device or gathering user data from the remote radio device. Examples for the base stations may include a 3G base station or Node B (NB), 4G base station or eNodeB (eNB), a 5G base station or gNodeB (gNB), a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

Herein, referring to a protocol of a layer may also refer to the corresponding layer in the protocol stack. Vice versa, referring to a layer of the protocol stack may also refer to the corresponding protocol of the layer. Any protocol may be implemented by a corresponding method.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
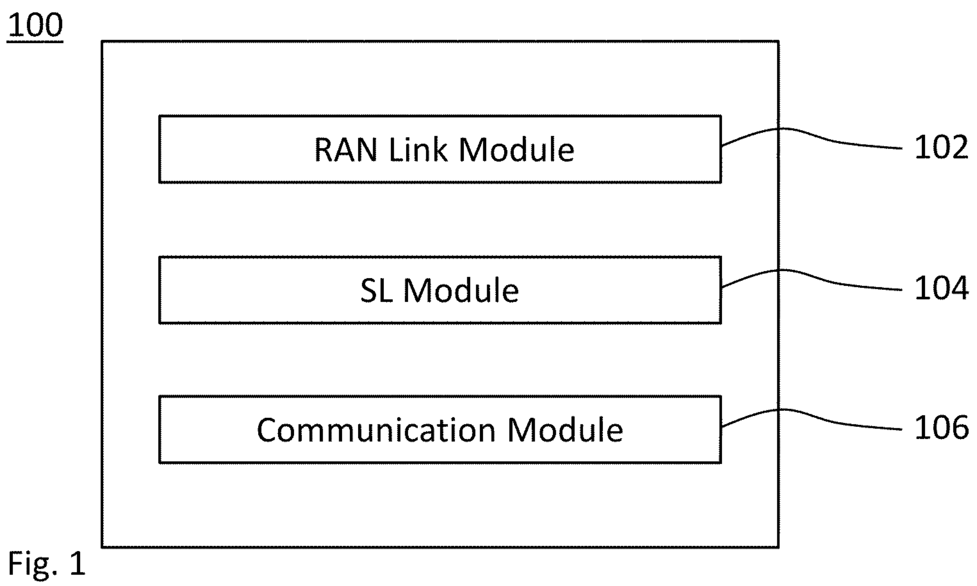
FIG. 1 shows a schematic block diagram of an embodiment of a device for communicating data between a first radio device and a second radio device.

FIG. 1 schematically illustrates a block diagram of a device according to the first device aspect and/or performing the first method aspect. The device is generically referred to by reference sign 100.

The device 100 comprises the modules indicated in FIG. 1 for performing respective steps of the first method aspect.

FIG. 1 schematically illustrates a block diagram of a first radio device 100 for communicating data between the first radio device 100 and a second radio device. The first radio device 100 comprises a RAN Link Module 102 that establishing a first radio communication path between the first radio device 100 and the second radio device, wherein the first radio communication path comprises a first radio access network (RAN) between the first radio device and a first base station of a RAN for serving the first radio device 100. A SL Module 104 of the device 100 establishes a second radio communication path between the first radio device 100 and the second radio device, the second radio communication path being different from the first radio communication path, wherein the second radio communication path comprises a first sidelink (SL) between the first radio device and the second radio device.

A Communication Module 106 of the first radio device 100 communicates data between the first radio device 100 and the second radio device using selectively at least one of the first radio communication path and the second radio communication path depending on at least one criterion.

Any of the modules of the device 100 may be implemented by units configured to provide the corresponding functionality.

The device 100 may also be referred to as, or may be embodied by, the first radio device (e.g., a transmitter). The first radio device 100 and the second radio device may be in direct radio communication, e.g., at least when using the second radio communication path. The second radio device may be embodied by the following device 200.

Figure 2:
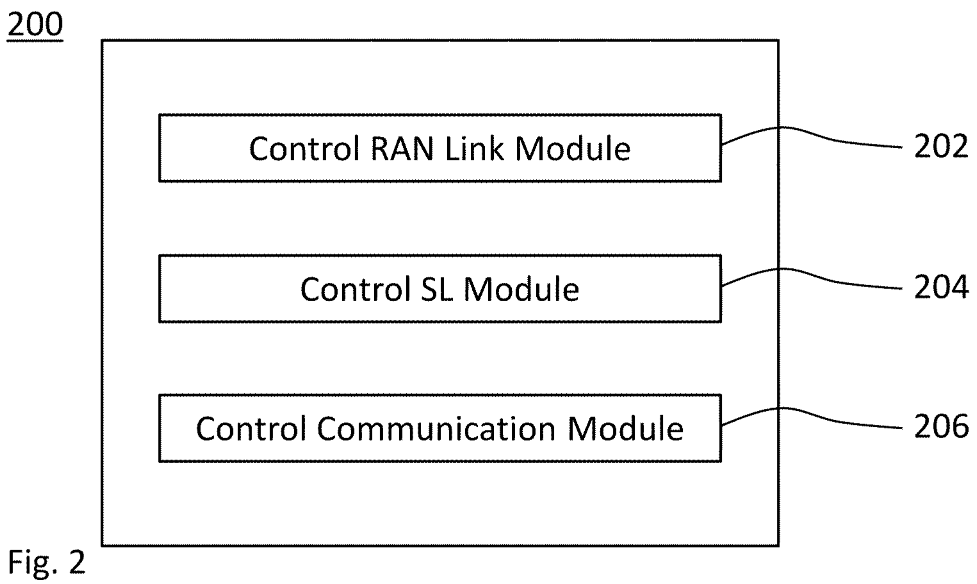
FIG. 2 shows a schematic block diagram of an embodiment of a device for controlling communicating data between a first radio device and a second radio device.

FIG. 2 schematically illustrates a block diagram of a device performing the second method aspect and/or according to the second device aspect. The device is generically referred to by reference sign 200.

The device 200 comprises the modules indicated in FIG. 2 for performing respective steps of the second method aspect.

FIG. 2 schematically illustrates a block diagram of a device controlling communicating of data between a first radio device and a second radio device.

A Control RAN Link Module 202 of the device 200 controls establishing a first radio communication path between the first radio device and the second radio device, wherein the first radio communication path comprises a first RAN link between the first radio device and the first base station.

A Control SL Module 204 of the device 200 controls establishing a second radio communication path between the first radio device and the second radio device, the second radio communication path being different from the first radio communication path, wherein the second radio communication path comprises a first sidelink (SL) between the first radio device and the second radio device.

A Control Communication Module 206 of the device 200 controls communicating data between the first radio device and the second radio device using selectively at least one of the first radio communication path and the second radio communication path depending on at least one criterion.

Any of the modules of the device 200 may be implemented by units configured to provide the corresponding functionality.

The device 200 may also be referred to as, or may be embodied by, the first base station (e.g., a receiver and/or the first base station of a RAN serving the first radio device). The first base station 200 and the first radio device may be in direct radio communication, e.g., at least when using the first radio communication path. The first radio device may be embodied by the above device 100.

Figure 3:
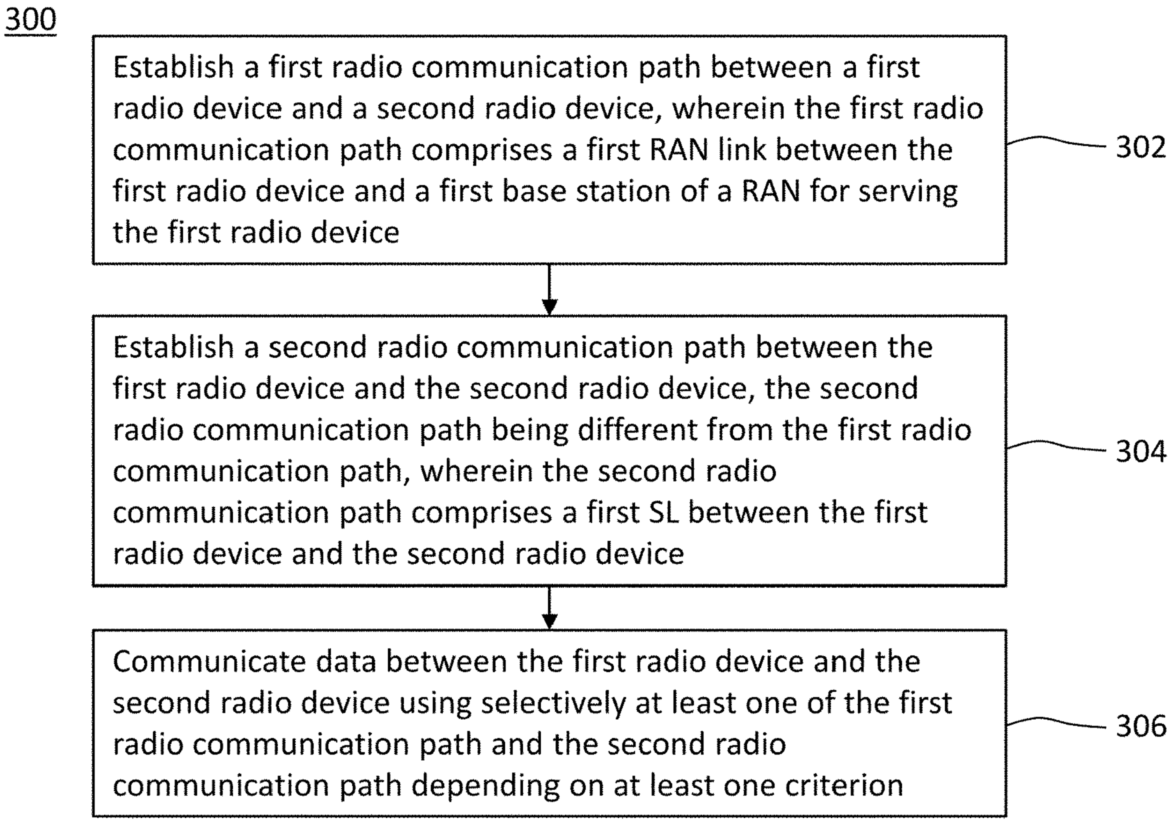
FIG. 3 shows a flowchart for a method of communicating data between a first radio device and a second radio device, which method may be implementable by the device of FIG. 1.

FIG. 3 shows an example flowchart for a method 300 according to the first method aspect. The method comprises the steps 302, 304 and 306 indicated in FIG. 3.

The method 300 may be performed by the device 100. For example, the modules 102, 104 and 106 may perform the steps 302, 304 and 306, respectively.

Figure 4:
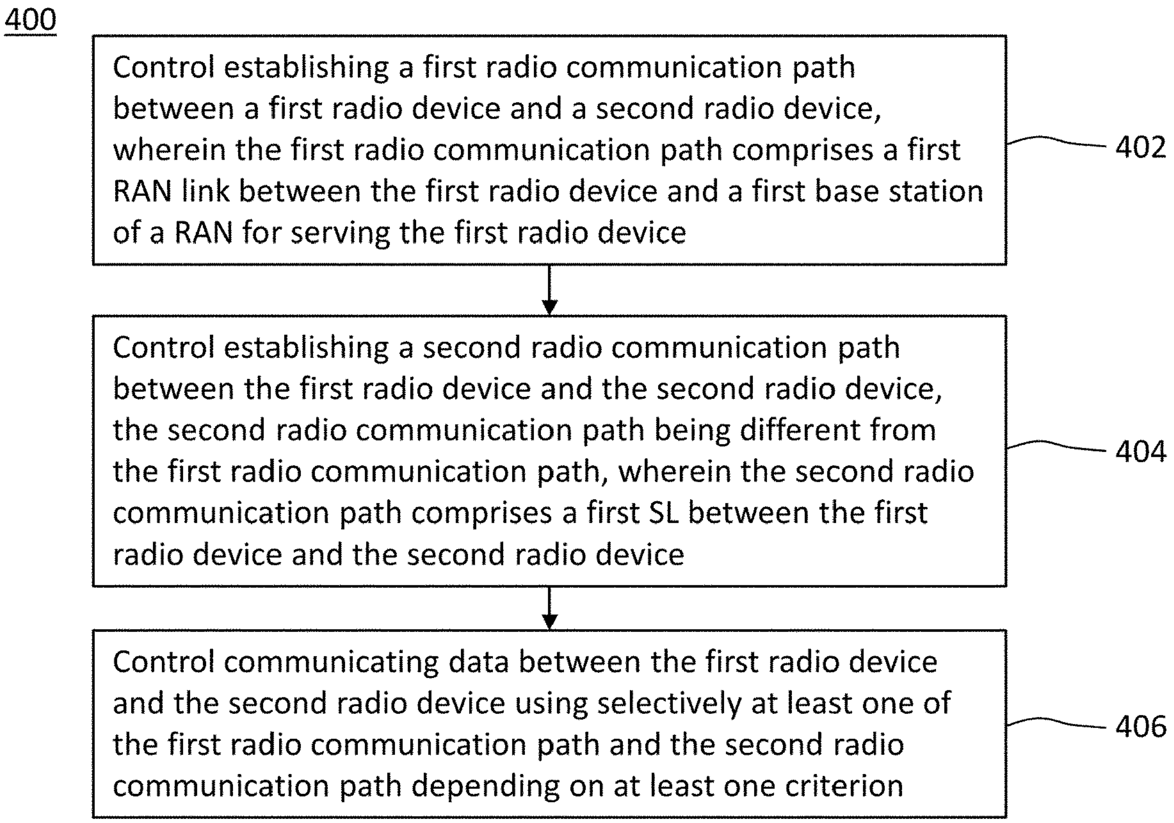
FIG. 4 shows a flowchart for a method of controlling communicating data between a first radio device and a second radio device, which method may be implementable by the device of FIG. 2.

FIG. 4 shows an example flowchart for a method 400 according to the second method aspect. The method comprises the steps 402, 404 and 406 indicated in FIG. 4.

The method 400 may be performed by the device 200. For example, the modules 202, 204 and 206 may perform the steps 402, 404 and 406, respectively.

In any aspect, the technique may selectively use an uplink (UL), downlink (DL) or direct communications between radio devices, e.g., device-to-device (D2D) communications or sidelink (SL) communications.

The device 100 and the device 200 may be a radio device and a base station, respectively. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Herein, whenever referring to signal quality, a corresponding step, feature or effect is also disclosed for a signal-to-noise ratio (SNR) or for a signal-to-interference-and-noise ratio (SINR).

The methods 300 and/or 400 may perform a dynamic path selection between the second radio communication path (e.g., one or more sidelinks) and the first radio communication path (e.g., one or more Uu radio interfaces) in the step 306 and/or 406, e.g., for reliable data transmission.

Alternatively or in addition, any one of the methods 300 and 400 may comprise, in case of multiple available and/or configured transmission paths (i.e., the first and second radio communication paths), a default (e.g., primary) path is selected (e.g., configured) and/or path switching is performed based on certain criteria and parameters according to the step 306 and/or 406. Alternatively or in addition, any one of the methods 300 and 400 may comprise, in case of multiple available and/or configured transmission paths, per-packet path selection based on certain criteria and parameters according to the step 306 and/or 406.

Embodiments of the technique are described with reference to the FIGS. 5A to 5C.

Figure 5C:
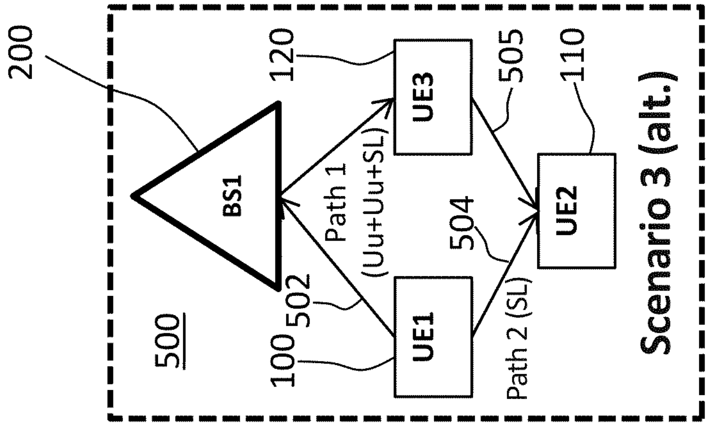
FIG. 5C schematically illustrates a third example of a radio network comprising embodiments of the devices of FIGS. 1 and 2 for performing the methods of FIGS. 3 and 4, respectively.
Figure 5B:
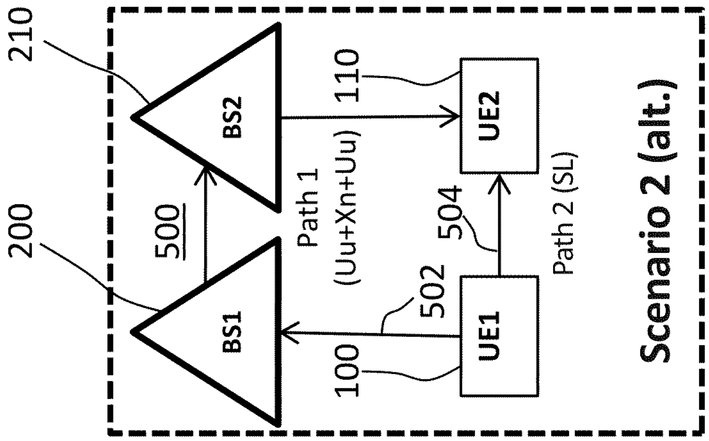
FIG. 5B schematically illustrates a second example of a radio network comprising embodiments of the devices of FIGS. 1 and 2 for performing the methods of FIGS. 3 and 4, respectively.
Figure 5A:
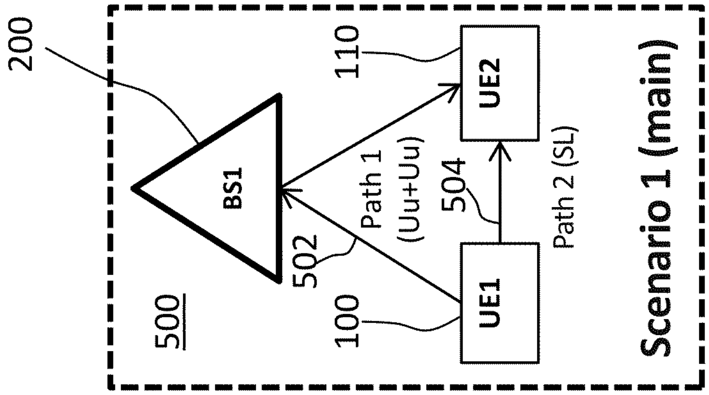
FIG. 5A schematically illustrates a first example of a radio network comprising embodiments of the devices of FIGS. 1 and 2 for performing the methods of FIGS. 3 and 4, respectively.

Each of the FIGS. 5A to 5C schematically illustrates a RAN 500, i.e., a system view, for one main and two alternative scenarios, respectively. An assumption for all scenarios may be that the first radio device 100 (without limitation referred to as UE1) can communicate with the second radio device 110 (without limitation referred to as UE2) using the first radio communication path (e.g., by path 1).

In a first scenario, the path 1 (i.e., the first radio communication path) extends through the same first base station (e.g., gNB) using UL and DL, e.g., according to the scenario 1 in FIG. 5A In a second scenario, the path 1 (i.e., the first radio communication path) extends through two different base stations (i.e., the first base station 200 and the second base station 210, e.g., gNBs) using UL transmission, Xn relay of data between two gNBs and DL transmission, e.g., scenario 2 in FIG. 5B.

In a third scenario, the path 1 (i.e., the first radio communication path) extends through gNB (or two gNBs similar to scenario 2) and a relay radio device 120 (referred to as UE3), using UL transmission, DL transmission to UE3 and sidelink transmission (i.e., the second SL) from UE3 to UE2, In each of these scenarios, the first radio device (UE1) can also communicate directly with the second radio device (UE2) via the first SL, in the second radio communication path, i.e. path 2.

The method 300 may comprise the steps 302 and 304 (also referred to as Step 1), wherein the UE1 100 is connected to UE2 110 via 2 paths: (1) via Uu with one or two gNBs (i.e., the first radio communication path) and, in some cases, UE3 acting as a relay (depending on scenario) and (2) via SL (i.e, the second radio communication path). According to this step, UE1 can be considered in dual connectivity mode where one connection is using SL and the other connection is using Uu.

In an optional Step 2, the UE1 100 receives instructions (e.g., a configuration message) from the network (i.e., the RAN 500, e.g., from the gNB 200) on path selection for data transmissions (in the step 306).

In the step 306 (also referred to as Step 3), per-packet path selection is performed by the UE1 100 depending upon the at least one criterion (e.g., different criteria and/or one or more rules).

It is to be noted that the at least one criteria (e.g., different criteria and/or rules defined for Step 3) may be predefined in general by a technical specification and/or configured (e.g., provided by the gNB 200) in the Step 2.

The technique is described in terms of two simultaneously configured paths. However, the technique can be extended to a scenario wherein UE1 100 can communicate to UE2 110 via multiple paths, wherein there are at least one SL and at least one Uu interfaces used by the UE1 100. In such a case, each path may include different combinations of Uu and SL transmissions. For example, there can be four paths: path 2 from scenario 1 (SL), path 1 from Scenario 1 (Uu UL+Uu DL), path 1 from scenario 2 (Uu UL+Xn+Uu DL) and path 1 from scenario 3 (Uu UL+Uu DL+SL relay) in FIG. 3.

Furthermore, the technique may be equally applicable to the case when the gNB 200 is the transmitting node and/or paths are defined using SL based relays.

In the following, detailed embodiments of the technique are disclosed to illustrate the embodiments of the technique.

In one detailed embodiment (e.g., a procedure, i.e., an embodiment of the method 300), the UE1 100 has established connection to both UE2 (via SL) and gNB (via UL), i.e. Step 1 or the steps 302 and 304. Afterwards, the UE1 100 is configured to prioritize transmission via the SL (Step 2), i.e. SL is configured as a default (or primary path). A packet data convergence protocol (PDCP) split bearer is configured for the UE1 100 with UL path (i.e., the first radio communication path) associated with one radio link control (RLC) entity and/or with one logical channel, as well as a SL path associated with another RLC entity and/or another logical channel (i.e., the second radio communication path).

Logical channel restrictions may be configured to restrict transmissions in the step 306 for each RLC entity and/or logical channel to SL and UL, respectively (i.e., to the first and second radio communication path, respectively).

In this detailed embodiment, the PDCP entity is configured to route packets exclusively via the SL (i.e., the associated RLC), until a certain trigger event occurs depending on the at least one criterion (e.g., different criteria or rules) in the Step 3, i.e., the step 306.

Afterwards, the PDCP entity shall route the packets exclusively via the UL (associated RLC). The trigger event may be associated with a per-packet timer, which starts when packet becomes available and is stopped if packet is transmitted or successfully transmitted (e.g. acknowledged to be successfully transmitted). If the timer expires, the path selection change is triggered. The timer can also be configured to be a part of the packet delay budget. When due to this path selection, packets are becoming available for transmission on the UL (RLC), but no UL resources are available, SR and BSR will be triggered to request UL resources from the gNB. Further, there may be criteria to come back to default path operation, e.g. based on similar per-packet timer expiration, expiration of special non-default path operation timer (after X seconds) or after defined number of transmissions.

In a variant of the above, the UE1 100 is initially configured to prioritize UL transmission (i.e. UL is configured to be a default or primary path), and path selected is changed to SL transmission, after the trigger as described above.

In another detailed embodiment (e.g., a procedure, i.e., the method 300), the UE1 100 has established connection to both UE2 (via SL) and gNB (via UL), i.e. Step 1 or steps 302 and 304. Afterwards, the UE1 100 is configured to prioritize transmission via the SL according to the Step 2, i.e. SL 504 is configured as a default (e.g., primary) path.

Furthermore, the UE1 100 is configured with PDCP duplication, wherein the UL path (i.e., the first RAN link 502) is associated with one RLC entity and/or one logical channel and the other SL path (i.e., the first SL 504) is associated with another RLC entity and/or another logical channel.

In principle, the UE1 100 can transmit PDCP duplicates via both UL and SL (i.e., via both the first and second radio communication paths) if both UL and SL grants are available. In other variant, when the gNB 200 schedules additional UL resources, and potentially also cancels SL resources, the transmission in the step 306 would use the UL (i.e., the first radio communication path).

Alternatively or in addition, the UE1 100 can inform the gNB (e.g., by transmitting the control message) when the SL transmission leads to inacceptable latency for the packet of the data, so that gNB 200 can schedule UL resources. For instance, when a timer measuring successful packet transmission delay via SL expires, the UE1 100 indicates to the gNB 200 that this is the case. In other words, the UE1 100 refrains from transmitting a scheduling request (SR) and/or a buffer status report (BSR) on the UL (i.e., the first RAN link 502) while the SL (i.e., the first SL 504) is usable, i.e. while the timer has not expired, and/or transmits the SR and/or the BSR on the UL when the timer expires, to indicate need for resources.

In another detailed embodiment (e.g., procedure, i.e. the method 300), the UE1 100 has established connection to both UE2 (via SL) and gNB (via UL), i.e. Step 1. A PDCP split bearer is configured for the UE1 100 with UL path associated with one RLC entity and/or one logical channel as well as SL path associated with another RLC entity and/or another logical channel. Logical channel restrictions may be configured to restrict transmissions for each RLC entity and/or logical channel to SL and UL, respectively.

In this detailed embodiment, the PDCP entity is configured to route packets via either SL or Uu based on the at least one criterion (e.g., a certain criterion). The at least one criterion can be predefined (e.g., preconfigured, or configured as part of Step 2). Alternatively or in addition, the at least one criterion may include at least one of time synchronization accuracy, survival time, traffic load, etc.

When due to this path selection, one or more packets of the data are available for transmission in the step 306 on the UL (or SL), but no UL (or SL) resources are available, the SR and/or the BSR will be triggered to request UL (or SL) resources from the gNB 200.

The following generalized embodiments may be realized as disclosed herein below, or in combination with any one of the above embodiments and the claims.

A first generalized embodiment may relate to a method of controlling device-to-device (D2D, i.e., SL) communication, e.g., the method 300. The method 300 comprises a transmitting UE 100 (i.e., the first radio device) that is configured to apply path selection (e.g., reselection) for data packet transmission in the step 306 out of the established (e.g., configured and/or available) paths (i.e., including the first and second radio communication paths) to a second radio device (e.g., a receiver UE) based on at least one criterion, e.g., a predefined (e.g., configured) rule and/or criteria, wherein at least one sidelink interface (i.e., the first SL 504) and at least one Uu interface (i.e., the first RAN link 502) are of choice by the transmitting UE 100.

In a second generalized embodiment, the method according to first generalized embodiment comprises the UE 100 being configured to use a default (e.g., primary) path and routes packets exclusively via the default (e.g., primary)

path, optionally using its associated RLC entity and/or logical channel, until a second trigger event (e.g., a path (re) selection trigger) occurs to route the packets to the secondary path (using its associated RLC entity and/or logical channel).

In a third generalized embodiment, the method according to second generalized embodiment comprises a configuration to use the default path, which is provided by the network (e.g. the first base station 200).

In a fourth generalized embodiment, the method according to second generalized embodiment comprises a configuration to use the default path, which is selected by the first UE (i.e., UE1) 100.

A fifth generalized embodiment comprises the method according to any of the above generalized embodiments, wherein selection of the default path is based on a predefined (e.g., configured) criteria or rule. In case of multiple paths fulfilling the criteria, selection of the default path is done in a random fashion or based on a list of preferences. The preference may be given to a path with, e.g. better quality, lower latency, less hops/relays, higher capacity or throughput.

In a sixth generalized embodiment, the method according to any of the above generalized embodiments, wherein, if multiple secondary path candidates available for reselection, it is done in a random fashion or based on a list of preferences. The preference may be given to a path with, e.g. better quality, lower latency, less hops/relays, higher capacity or throughput.

A seventh generalized embodiment comprises the method according to any of the above generalized embodiments, wherein the path reselection trigger is based on link quality associated to the path. In one example, the link quality is measured as RSRP. In another example, it is measured as RSRQ. In yet another example, the link quality is measured as CSI report (including CQI etc.). In other words, if quality of the selected path drops below a configured limit, path re-selection is performed.

An eight generalized embodiment comprises the method according to any of the above generalized embodiments, wherein the path reselection trigger is based on number of consecutive packet losses. In one example, if there are more than N consecutive packet losses using the selected path, path re-selection is performed. N can either be a pre-defined or configured number. Alternatively, HARQ re-transmission attempts can be counted instead of packet losses.

A ninth generalized embodiment comprises the method according to any of the above embodiments, wherein the path reselection trigger is based on number of consecutive out-of-sync indication to higher layer from the lower layer. In one example, if there are more than N consecutive out-of-sync indication for the selected path, the path reselection is triggered. N can either be a pre-defined or configured number.

A tenth generalized embodiment comprises the method according to any of the above embodiments, wherein the path reselection trigger is associated with the per packet timer which starts when packet becomes available and is stopped if packet is successfully transmitted (e.g. acknowledged to be successfully transmitted). If the timer expires, the path selection change is triggered.

An eleventh generalized embodiment comprises the method according to any of the above embodiments, wherein the path reselection trigger is associated with the RLC ARQ feedback or HARQ feedback of the initial transmission of a packet. If the RLC ARQ NACK or HARQ NACK is received by the UE, the path selection change is triggered for the consequent retransmission.

A twelfth generalized embodiment comprises the method according to any of the above embodiments, wherein the path reselection trigger is associated with a time period, where the time period is defined as the time since the last successfully transmitted packet. If the period is longer than a configured or pre-defined threshold then the path selection change is triggered for the consequent packets. In one example, the configured or pre-defined threshold is based on the survival time requirements (associated with the DRBs or QoS flows or PDU sessions).

A thirteenth generalized embodiment comprises the method according to any of the above embodiments, wherein the trigger event (e.g., a path (re) selection trigger) is associated to a time synchronization error. If the time synchronization error is above a threshold, then the path selection change is triggered for the consequent packets. In some cases, the trigger is only evaluated if packets (e.g. associated with a certain data radio bearer (DRB) or QoS flow or PDU session) requiring time synchronization (e.g. a generalized Precision Time Protocol, gPTP) are being transmitted in the step 306, which may be indicated to the UE 100 from the gNB 200.

A fourteenth generalized embodiment comprises the method according to any of the above embodiments, wherein, the UE 100 comes back to routing packets to the default path based on the same or different predefined (e.g., configured) rule or criteria as described in any one of the above generalized seventh to thirteenth embodiments.

A fifteenth generalized embodiment comprises the method according to any of the above embodiments, wherein the path selection is based on a packet delay budget or survival time. For example, if the packet delay budget or survival time is higher than a configured or defined threshold, i.e. minimum acceptable PDB or survival time for the path, then the path is selected. In other words, only paths providing certain QoS level can be used.

A sixteenth generalized embodiment comprises the method according to any of the above embodiments, wherein the time for which a change in the path selection (e.g. path other than the default path) is kept is associated with a timer. The timer is started when the change in path selection is triggered. When the timer expires, the change of path to the default or earlier path is triggered.

A seventeenth generalized embodiment comprises the method according to any of the above embodiments, wherein a path is selected (e.g., configured) per radio bearer and/or per QoS flow and/or per PDU session. In one example, packets belonging to a mobile broadband (MBB) radio bearer may always use path 1 and the packets belonging to an ultra-reliable low-latency communication (URLLC) radio bearer may always use path 2.

In some cases, packets belonging to one radio bearer can be transmitted using any of the multiple available and/or configured paths. In other words, multiple paths are configured per radio bearer and/or QoS flow and/or PDU session.

An eighteenth generalized embodiment comprises the method according to any of above embodiments, wherein path selection in the step 306 is based on the traffic congestion or load in at least one of the paths. In one example, a path with the lowest load is chosen (i.e., selected) for the packet transmission in the step 306.

A nineteenth generalized embodiment comprises the method according to any of above embodiments, wherein path selection is based on a synchronization error. In this case, the UE 100 selects the path with the best time synchronization accuracy for the transmission of the packet.

A twentieth generalized embodiment comprises the method according to any of above embodiment, wherein path selection in the step 306 is based on the synchronization error requirement associated with the DRB or the QoS flow or the PDU session for a packet. In this case, the UE 100 selects the path which fulfills the synchronization error requirement (e.g. associated with a certain DRB or QoS flow or PDU session). For example, the synchronization requirement may be expressed in terms of TSN synchronization requirements (e.g., path 1 supports a first set of synchronization requirements and path 2 supports a second set of TSN synchronization requirements).

Any embodiment may perform time-sensitive network (TSN) time synchronization.

The achievable latency and reliability performance of NR are keys to support use cases with tighter requirements. In order to extend the NR applicability in various verticals such as factory automation, transport industry and electrical power distribution, NR Industrial Internet of Things (IIoT) has concluded that certain enhancements of RAN features in different layers should be specified for Release 16. One area of interest is to support TSN time synchronization in 5G system, as defined in the 3GPP document TS 23.501.

For TSN Synchronization, the entire E2E 5G system can be considered as an IEEE 802.1AS "time-aware system". Only the TSN Translators (TTs) at the edges of the 5G system need to support the IEEE 802.1AS operations. UE, gNB, UPF, NW-TT and DS-TTs are synchronized with the 5G Grand Master (GM) clock (i.e. the 5G internal system clock) which shall serve to keep these network elements synchronized. The TTs located at the edge of 5G system fulfil all functions related to IEEE 802.1AS.

Figure 6:
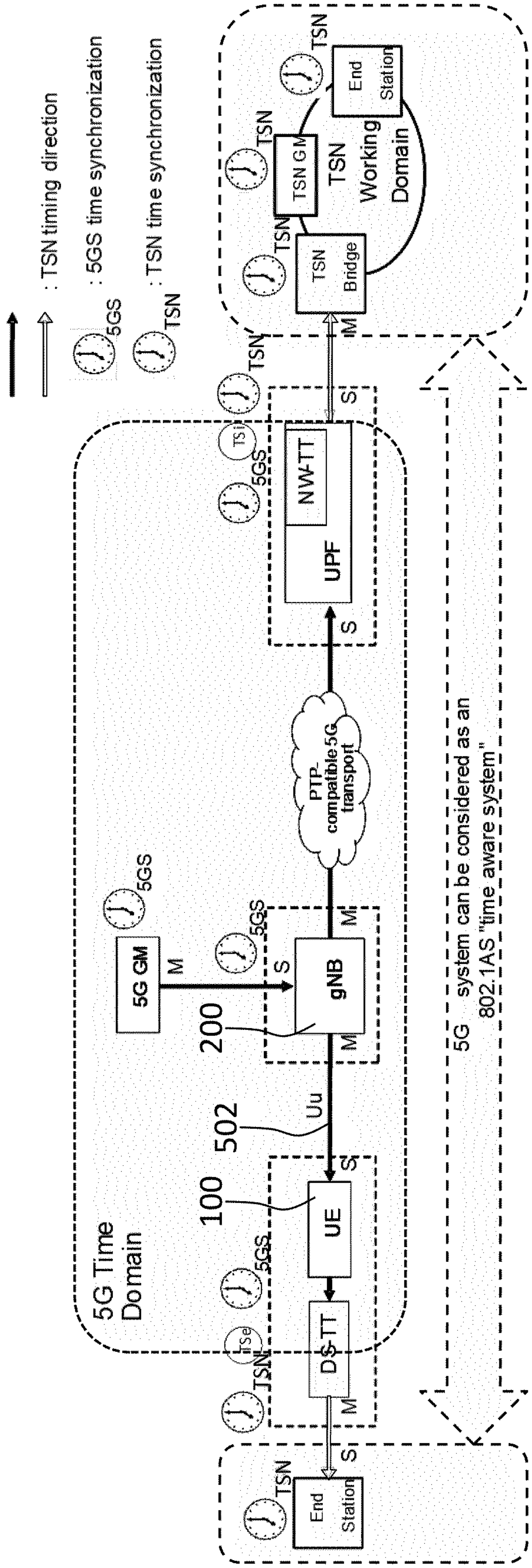
FIG. 6 schematically illustrates a fourth example of a radio network comprising embodiments of the devices of FIGS. 1 and 2 for performing the methods of FIGS. 3 and 4, respectively.

FIG. 6 schematically illustrates the 5G and TSN clock distribution model via 5GS. For example, FIG. 6 schematically illustrates a 5G system 500, which is modelled as IEEE 802.1AS compliant time aware system for supporting TSN time synchronization.

FIG. 6 depicts the two synchronizations systems considered, the 5GS synchronization and the TSN domain synchronization, as well as the Master (M) and Slave(S) ports considered when the TSN GM is located at TSN working domain.

5GS synchronization may be used for NG RAN synchronization. 5G RAN synchronization is specified in TS 38.331. This service is used for 5GS internal synchronization wherein the gNB, the NW-TT at UPF side and the DS-TT at UE side are all synchronized to the same 5G reference time sourced from e.g. a GPS receiver.

TSN domain synchronization may provide synchronization service to TSN network. This process follows IEEE 802.1AS. Upon reception of a downlink gPTP message the NW-TT makes an ingress timestamping (TSi) for each gPTP event (Sync) message and UPF then forwards the gPTP message to the UE via user plane. A UE receives the gPTP messages and forwards them to the DS-TT. The DS-TT then creates egress timestamping (TSe) for the gPTP event (Sync) messages for external TSN working domains. The difference between TSi and TSe is considered as the calculated residence time spent within the 5G system for this gPTP message expressed in 5GS time. The DS-TT then modifies the payload of the gPTP message that it sends towards the downstream TSN node by adding the calculated residence time expressed in TSN GM time to the correction field.

The two synchronization processes can be considered independent. The two synchronization processes can be considered independent from each other and the gNB only needs to be synchronized to the 5G GM clock to thereby acquire the value of the 5GS time (i.e. the 5G reference time).

Alternatively or in addition, any of the embodiments may use any one feature or step of resource allocation for sidelink transmissions, e.g., as described below.

Like in LTE sidelink, there are two resource allocation modes for NR sidelink:

- Network-based resource allocation, in which the network selects the resources and other transmit parameters used by sidelink UEs. In some cases, the network may control every single transmission parameter. In other cases, the network may select the resources used for transmission but may give the transmitter the freedom to select some of the transmission parameters, possibly with some restrictions. In the context of NR SL, 3GPP refers to this resource allocation mode as Mode 1.
- Autonomous resource allocation, in which the UEs autonomously select the resources and other transmit parameters. In this mode, there may be no intervention by the network (e.g., out of coverage, unlicensed carriers without a network deployment, etc.) or very minimal intervention by the network (e.g., configuration of pools of resources, etc.). In the context of NR SL, 3GPP refers to this resource allocation mode as Mode 2.

Alternatively or in addition, any of the embodiment may use any one feature or step of the following physical sidelink channels. In NR SL, the following different physical sidelink channels are defined.

- Physical sidelink control channel (PSCCH): This is used to carry (part of) sidelink control information (SCI), which is also termed as 1st stage SCI. 1st stage SCI carries the resource allocation information which is essential to decode for performing sensing-based resource allocation (i.e. mode-2)
- Physical sidelink shared channel (PSSCH): This is used to carry actual data transmission. Also, a part of SCI, also termed as 2nd stage SCI, is carried over PSSCH.
- Physical sidelink feedback channel (PSFCH): This is used to carry the HARQ feedback information such as HARQ-ACK or HARQ-NACK. In Rel. 16, only sequence based PSFCH is supported.
- Physical sidelink broadcast channel (PSBCH): This is used to carry the system information which is used to perform sidelink transmissions.

Alternatively or in addition, any of the embodiment may use a configuration, a pre-configuration, and/or a predefinition of parameters (e.g., the at least one criterion). To operate sidelink different parameters are used. These parameters may be provided to the first radio device 100 in at least one of the following ways:

- The parameters may be configured by a network node (e.g., a gNB). Configuration may be received using dedicated or broadcast signaling, for example using a SIB or RRC signaling. This is typically used when the UE is in coverage of a gNB for a given frequency.
- Alternatively or in addition, the parameters may be pre-configured in the UE. In this case, the pre-configuration is stored in the UE, typically in the SIM card. This is typically used when the UE is not in coverage for a given frequency.
- Alternatively or in addition, the parameters may be pre-defined or defined in a specification.

In this disclosure, the term (pre-) configuration includes any of configuration and pre-configuration.

Alternatively or in addition, any of the embodiment may use any one feature or step of resource allocation for Industrial Internet-of-Things (IIoT) and/or Ultra-reliable low latency communication (URLLC), e.g., as described below.

3GPP NR is capable of fulfilling the requirements of ultra-reliable low latency communication (URLLC). Enhancements for URLLC and Industrial Internet of things (IIoT) were introduced in NR Release 16 and further enhanced as part of current Release 17, 3GPP discussions in work item RP-201310. Several features for reaching low latencies and/or high reliability of transmission had been introduced. Furthermore, support of 5G NR for time sensitive networking (TSN) had been introduced.

Alternatively or in addition, any of the embodiment may meet URLLC reliability and low latency delay simultaneously, e.g., using at least one of the following features.

Ultra-reliable and low latency communication (URLLC) requirements specified for NR by the 3GPP are intended to handle a variety of new demanding wireless use cases. Such use cases appear in the automotive safety field, in factory automation, as well as when augmented and virtual reality functionality with tactile feedback are run over new radio (NR). The performance requirements are then enhanced, from 4G mobile broadband capacity/spectral efficiency requirements, to include also stringent requirements on round trip latency and reliability. Typically, the latency requirements reach sub-millisecond figures and the reliability requirements reach packet loss probabilities as low as Oct. 6, 2010-4. This may require re-design, as compared to previous mobile broadband focused systems.

First, focusing on the reliability figures, it is noted that the mobile broadband transmission system is optimized for operation at a block-error rate of 1-10%, meaning that error rates of perhaps $10^{-2}$ are achievable without re-transmission. There is no easy realizable way to improve this figure since the measurement of the statistics to achieve, say a block-error rate of $10^{-6}$, would require data collection over $k(10^{-6})^{-1}=k\ 10^{6}$ transmission time intervals, where k may be of the order of 100. With a TTI of 1 millisecond, this adds up to 3 hours which is clearly infeasible as compared to the radio channel variation rate.

To solve this issue one may e.g. write $10^{-6}=(10^{-2})^{3}$. This relation hints to a solution by means of transmission of the URLLC data over three independent wireless interfaces, i.e. towards running URLLC using some kind of multi-point transmission. The requirements also hint towards a need for at least three multi-path connections, which may be based on dual connectivity or repetitions.

Alternatively or in addition, any of the embodiment may use at least one of the following reliability tools.

The problem is that there are no existing retransmission schemes with purpose to optimize both spectrum efficiency and latency at higher protocol layer. To meet application layer reliability requirements, there are many existing tools in different layers. One of the most commonly used tools on different protocol layers are retransmissions, for examples retransmissions on TCP, PDCP, RLC, and MAC layer. These retransmission schemes in different protocol layers are performed when the transmission feedback indicates that the transmission has failed. For example, a MAC layer failure resulting from failed HARQ (re-)transmissions in MAC layer will trigger a retransmission of a RLC packet; multiple RLC retransmission failures will result in a failed transmission of PDCP packet and thus a PDCP retransmission will be triggered. At the TCP layer, if TCP acknowledge is not received, a retransmission of TCP packet will be triggered. These schemes are on demand based on transmission feedback and optimized for resource utilization efficiency. For example, if a transmission failed, a retransmission is triggered, and the extra resources are consumed only if a retransmission occurs. However, since any retransmission loop will require at least a round trip time delay to receive the feedback information, they are not optimized to minimize latency and transmission delay.

It is a challenge especially for guaranteed delay critical GBR. For example, for 5QI=85 smart grid service in large MNO network, with required packet error rate below $10^{-5}$ and with packet delay budget=3 ms in RAN, retransmissions that potentially are required for reliability purpose in different layers are not affordable due to the latency constraint.

Alternatively or in addition, any of the embodiment may use repetitions and/or duplications of the packets.

It is possible to have reliability improvement with latency optimized solution that multiple simultaneous replicated/repeated packets transmitted in multiple independent paths, including both time, frequency, spatial resources, may improve reliability with relaxed BLER target at individual transmission path.

One example in prior art concept is PDCP duplication. PDCP packets are duplicated in different carriers or bands based on dual connectivity scheme shown in FIG. 7 and carrier aggregation scheme in FIG. 6. Maximally 4 copies are supported. The number of replications is RRC configured and can be activated through MAC CE or RRC configuration.

Figure 7:
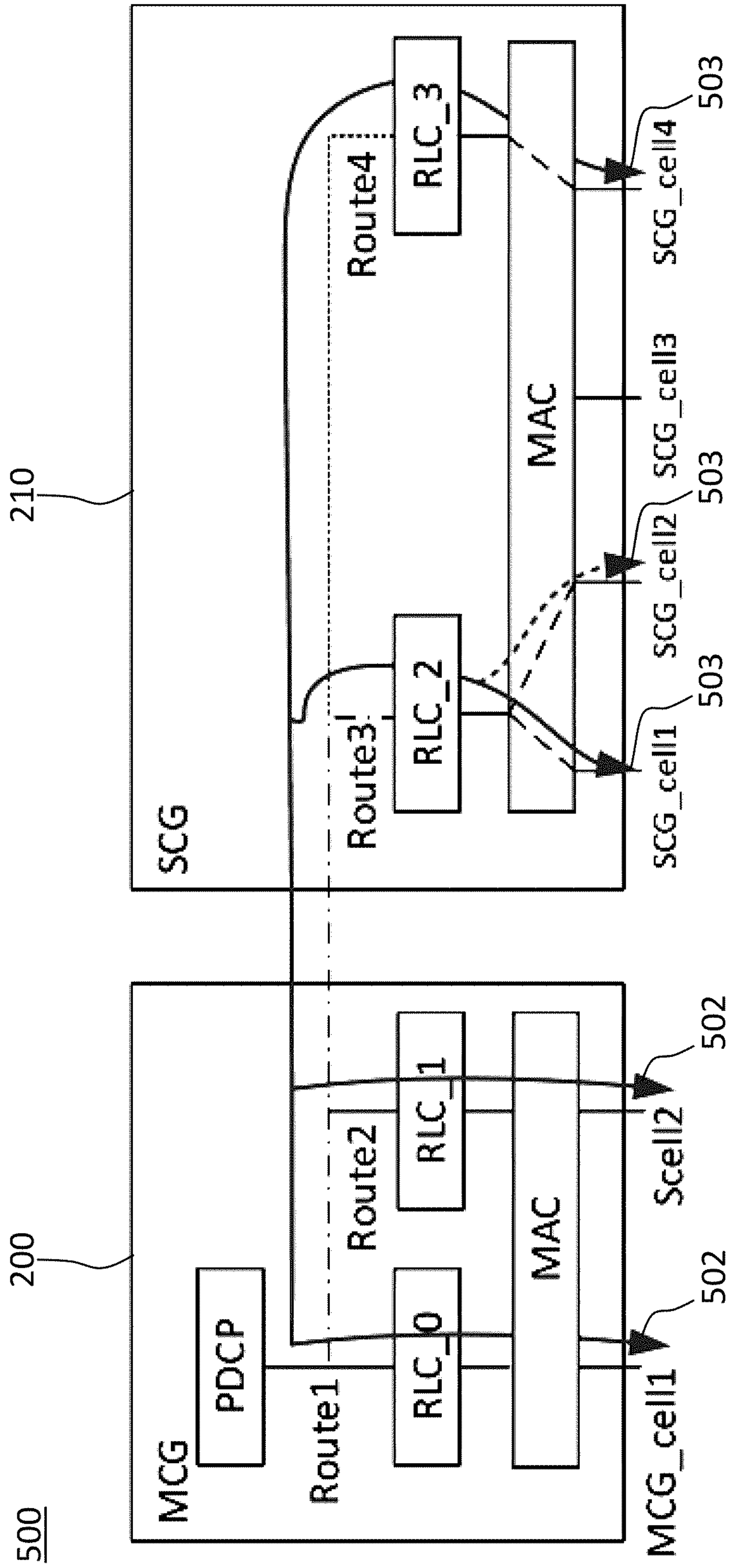
FIG. 7 schematically illustrates a fifth example of a radio network comprising embodiments of the devices of FIGS. 1 and 2 for performing the methods of FIGS. 3 and 4, respectively.

FIG. 7 schematically illustrates an example of the RAN 500 with a dual connectivity (DC) and carrier aggregation (CA), e.g., in both a master cell group (MCG) embodying the device 200 and a secondary cell group (SCG) embodying the second base station 210. For example, the RAN 500 may comprise a configuration with 4 configured RLC entities for PDCP data duplication and only 4 activated RLC entities activated.

Any aspect of the technique may be implemented according to the 3GPP document TS 38.321, version 16.5.0, and/or TS 38.331, version 16.5.0.

Figure 8:
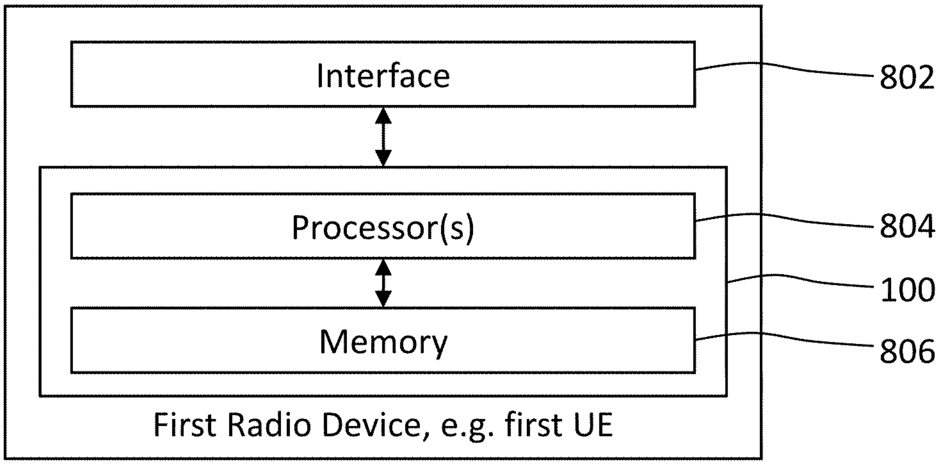
FIG. 8 shows a schematic block diagram of a first radio device embodying the device of FIG. 1.

FIG. 8 shows a schematic block diagram for an embodiment of the device 100. The device 100 comprises processing circuitry, e.g., one or more processors 804 for performing the method 300 and memory 806 coupled to the processors 804. For example, the memory 806 may be encoded with instructions that implement at least one of the modules 102, 104 and 106.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 806, radio device functionality. For example, the one or more processors 804 may execute instructions stored in the memory 806. Such functionality may include providing various features and steps discussed herein, including any of the benefits disclosed herein. The expression “the device being operative to perform an action” may denote the device 100 being configured to perform the action.

As schematically illustrated in FIG. 8, the device 100 may be embodied by a first radio device 800, e.g., functioning as a transmitting UE. The first radio device 800 comprises a radio interface 802 coupled to the device 100 for radio communication with one or more receiving stations, e.g., functioning as a receiving base station or a receiving UE.

Figure 9:
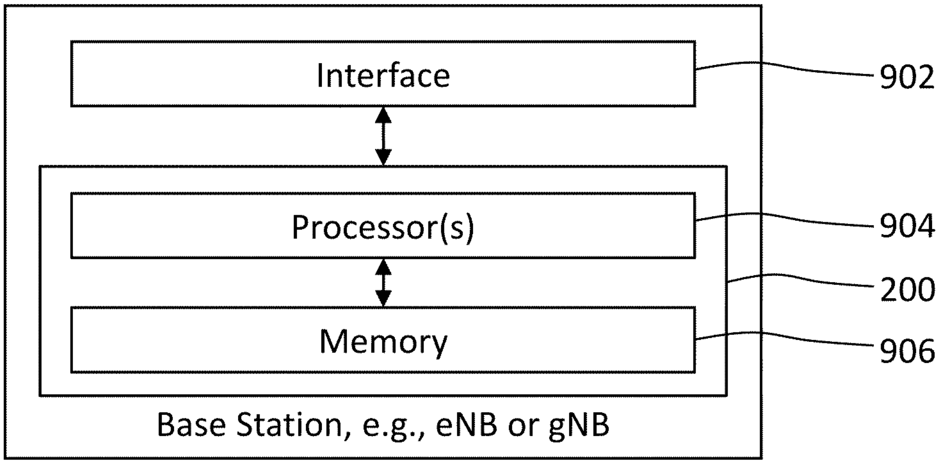
FIG. 9 shows a schematic block diagram of a first base station embodying the device of FIG. 2.

FIG. 9 shows a schematic block diagram for an embodiment of the device 200. The device 200 comprises processing circuitry, e.g., one or more processors 904 for performing the method 400 and memory 906 coupled to the processors 904. For example, the memory 906 may be encoded with instructions that implement at least one of the modules 202, 204 and 206.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 906, base station functionality. For example, the one or more processors 904 may execute instructions stored in the memory 906. Such functionality may include providing various features and steps discussed herein, including any of the benefits disclosed herein. The expression "the device being operative to perform an action" may denote the device 200 being configured to perform the action.

As schematically illustrated in FIG. 9, the device 200 may be embodied by a first base station 900, e.g., functioning as a receiving base station. The first base station 900 comprises a radio interface 902 coupled to the device 200 for radio communication with one or more transmitting stations, e.g., functioning as a transmitting base station or a transmitting UE.

Figure 10:
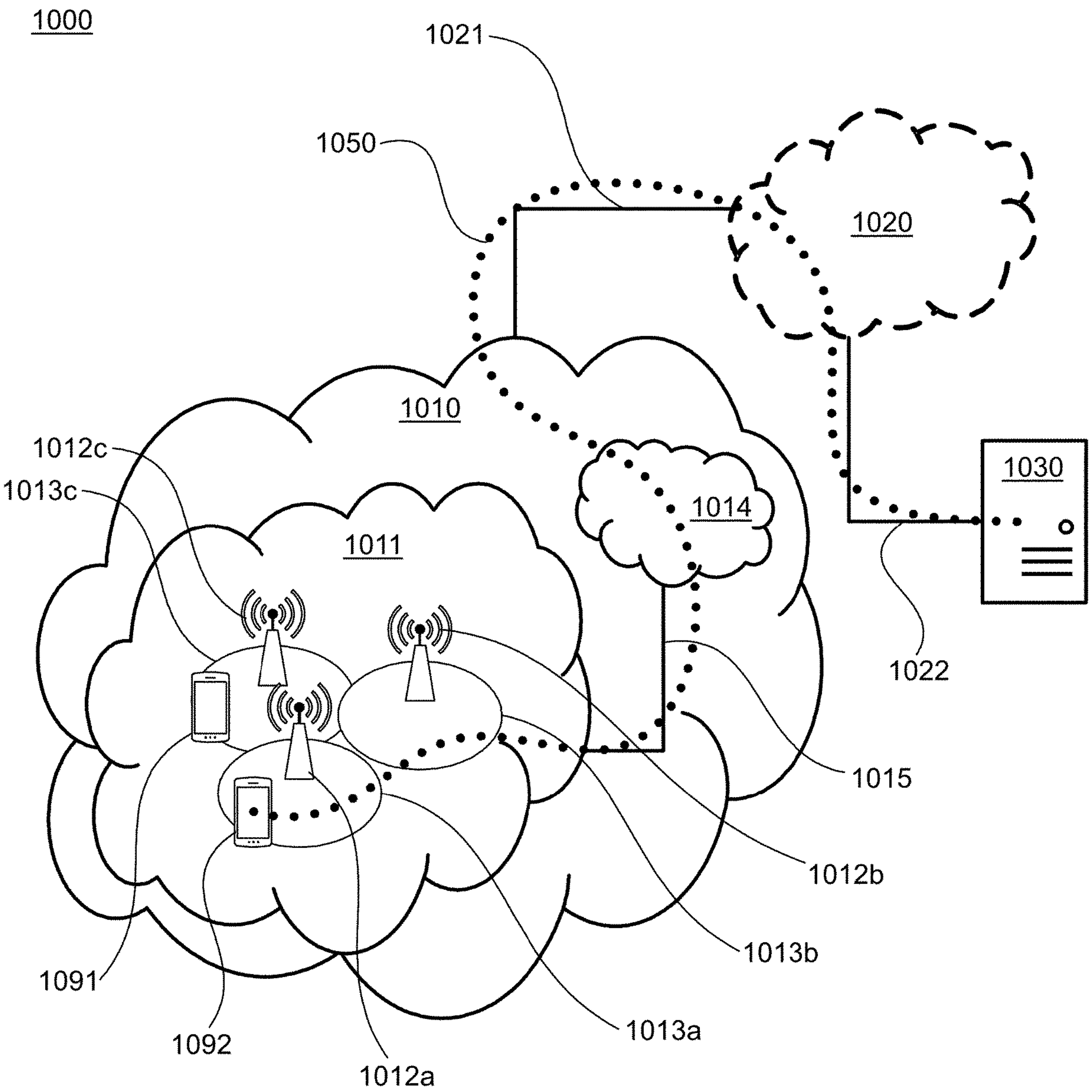
FIG. 10 schematically illustrates an example telecommunication network connected via an intermediate network to a host computer.

With reference to FIG. 10, in accordance with an embodiment, a communication system 1000 includes a telecommunication network 1010, such as a 3GPP-type cellular network, which comprises an access network 1011, such as a radio access network, and a core network 1014. The access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to the core network 1014 over a wired or wireless connection 1015. A first user equipment (UE) 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

Any of the base stations 1012 and the UEs 1091, 1092 may embody the device 200 and the device 100, respectively.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system 1000 of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

By virtue of the method 300 being performed by any one of the UEs 1091 or 1092 and/or the method 400 by any one of the base stations 1012, the performance or range of the OTT connection 1050 can be improved, e.g., in terms of increased throughput and/or reduced latency. More specifically, the host computer 1030 may indicate to the RAN 500 or the relay radio device 120 or the first radio device 100 or the second radio device 110 (e.g., on an application layer) the QoS of the traffic, which may influence the selected radio communication path.

Example implementations, in accordance with an embodiment of the UE, base station and host computer discussed in the preceding paragraphs, will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data, which is transmitted using the OTT connection 1150. The user data may depend on the location of the UE 1130. The user data may comprise auxiliary information or precision advertisements (also: ads) delivered to the UE 1130. The location may be reported by the UE 1130 to the host computer, e.g., using the OTT connection 1150, and/or by the base station 1120, e.g., using a connection 1160.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120.

The communication interface 1126 may be configured to facilitate a connection 1160 to the host computer 1110. The connection 1160 may be direct, or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
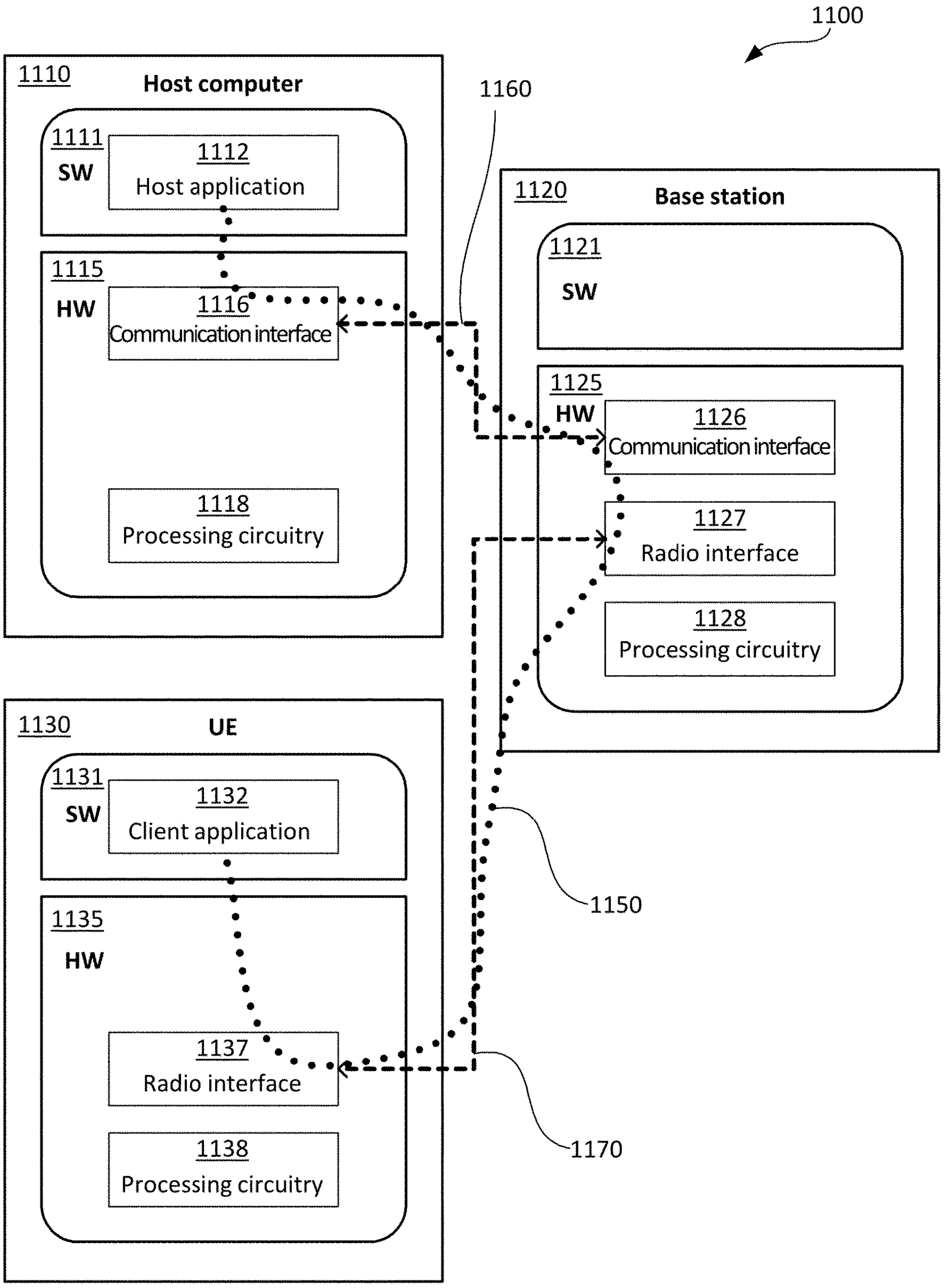
FIG. 11 shows a generalized block diagram of a host computer communicating via a base station or radio device functioning as a gateway with a user equipment over a partially wireless connection.

It is noted that the host computer 1110, base station 1120 and UE 1130 illustrated in FIG. 11 may be identical to the host computer 1030, one of the base stations 1012*a*, 1012*b*, 1012*c* and one of the UEs 1091, 1092 of FIG. 10, respectively. This is to say, the inner workings of these entities may be as shown in FIG. 11, and, independently, the surrounding network topology may be that of FIG. 10.

In FIG. 11, the OTT connection 1150 has been drawn abstractly to illustrate the communication between the host computer 1110 and the UE 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or "dummy" messages, using the OTT connection 1150 while it monitors propagation times, errors etc.

Figure 12:
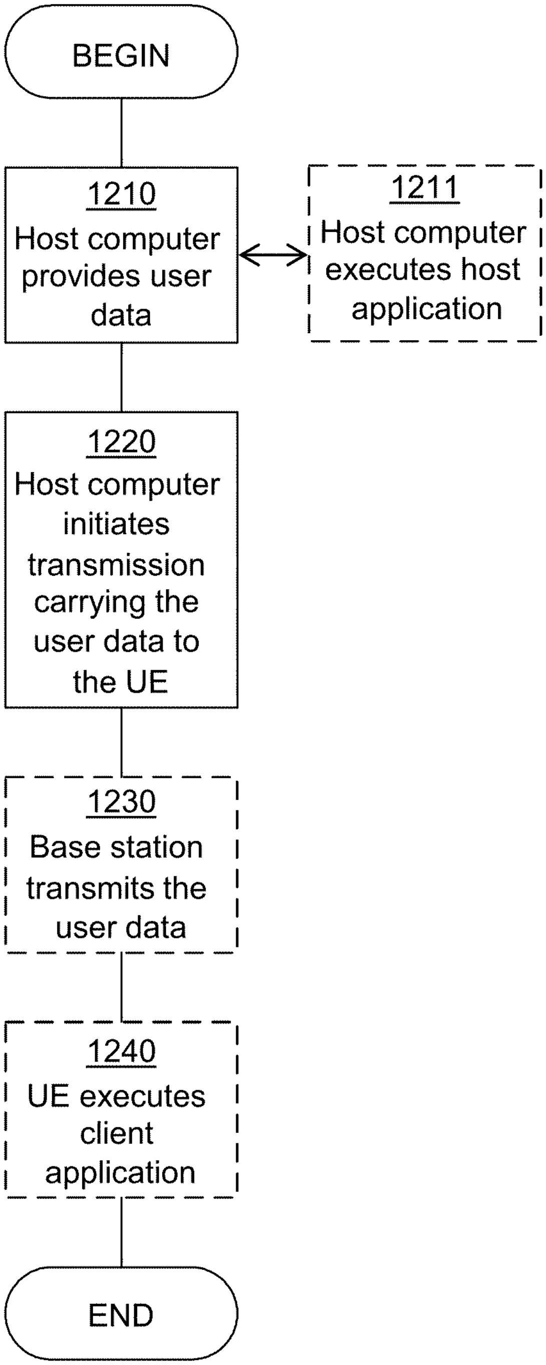
FIGS. 12 and 13 show flowcharts for methods implemented in a communication system including a host computer, a base station or radio device functioning as a gateway and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this paragraph. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

Figure 13:
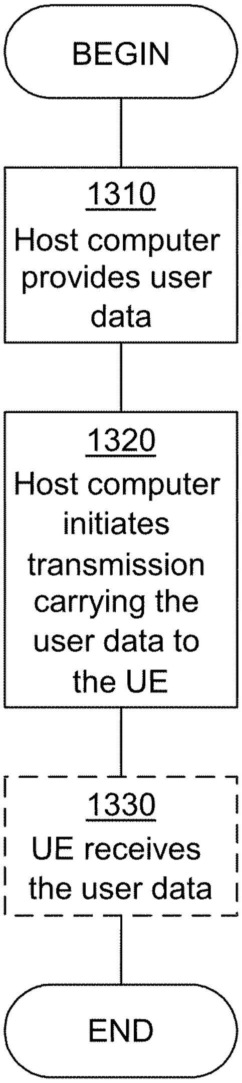

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this paragraph. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

As has become apparent from above description, at least some embodiments of the technique allow for an improved selection of a relay radio device and/or an improved selection of a SL connection establishment. Same or further embodiments can ensure that the traffic relayed by the relay radio device is given the appropriate QoS treatment.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of communicating data between a first radio device and a second radio device, the method being performed by the first radio device and comprising:

establishing a first radio communication path between the first radio device and the second radio device, wherein the first radio communication path comprises a first radio access network (RAN) link between the first radio device and a first base station of a RAN for serving the first radio device;

establishing a second radio communication path between the first radio device and the second radio device, the second radio communication path being different from the first radio communication path, wherein the second radio communication path comprises a first sidelink (SL) between the first radio device and the second radio device;

receiving a configuration message from the first base station, the configuration message being indicative of at least one criterion; and communicating data between the first radio device and the second radio device by selecting, depending on the at least one criterion, the first radio communication path, the second radio communication path, or both the first and second radio communication paths.

2. The method of claim 1, wherein the establishing of the first radio communication path comprises establishing at least two first radio communication paths between the first radio device and the second radio device, wherein each of the at least two first radio communication paths comprises a first RAN link between the first radio device and the first base station.

3. The method of claim 2, wherein the communicating of the data between the first radio device and the second radio device comprises performing dynamic path selection in dependence on whether the at least one criterion is met, the dynamic path selection being dynamic selection of one or both the first and second radio communication paths.

4. The method of claim 1, wherein the first radio communication path further comprises a second RAN link between the first base station and the second radio device.

5. The method of claim 1, wherein the first radio communication path further comprises:

a backhaul link between the first base station and a second base station of the RAN, and a second RAN link between the second base station and the second radio device for serving the second radio device.

6. The method of claim 1, wherein the first radio communication path further comprises:

a second RAN link between the first base station and a relay radio device, and a second SL between the relay radio device and the second radio device.

7. The method of claim 1, wherein the first radio communication path further comprises:

a backhaul link between the first base station and a second base station of the RAN, and a second RAN link between the second base station and a relay radio device, and a second SL between the relay radio device and the second radio device.

8. The method of claim 7, wherein at least one or each of the first SL and the second SL further comprises at least two SL-based hops.

9. The method of claim 1, wherein the first radio device and the second radio device are in dual connectivity (DC), wherein a first connection of the DC uses the first radio communication path and a second connection of the DC uses the second radio communication path.

10. The method of claim 1, wherein the first radio device is configured with a split bearer for the communicating of the data between the first radio device and the second radio device.

11. The method of claim 1, wherein the first radio communication path is associated with a first radio link control (RLC) entity of the first radio device, and the second radio communication path is associated with a second RLC entity of the first radio device.

12. The method of claim 1, wherein the communicating of the data uses the first radio communication path or the second radio communication path selectively per packet of the data.

13. The method of claim 1, wherein the communicating of the data comprises at least one of:

duplicating packets of the data at a Packet Data Convergence Protocol (PDCP) entity of the first radio device in dependence on whether the at least one criterion is met; and transmitting duplicates of the packets of the data on the first radio communication path and the second radio communication path to the second radio device in dependence on whether the at least one criterion is met.

14. The method of claim 1, wherein the communicating of the data comprises at least one of:

transmitting duplicates of the packets of the data on the first radio communication path and the second radio communication path until a first trigger event according to the at least one criterion occurs;

routing packets of the data exclusively on the second radio communication path until the first trigger event according to the at least one criterion occurs; and routing packets of the data exclusively on the first radio communication path after the first trigger event according to the at least one criterion occurred.

15. The method of claim 14, wherein the communicating of the data comprises at least one of:

transmitting duplicates of the packets of the data on the first radio communication path and the second radio communication path until a second trigger event according to the at least one criterion occurs;

routing packets of the data exclusively on the first radio communication path until the second trigger event according to the at least one criterion occurs; and routing packets of the data exclusively on the second radio communication path after the second trigger event according to the at least one criterion occurred.

16. The method of claim 15, wherein a first timer is initiated when the packets become available for transmission at the first radio device, and wherein at least one of the first trigger event and the second trigger event comprises expiry of the first timer before the packets are successfully transmitted from the first radio device to the second radio device.

17. The method of claim 16, wherein the first timer is configured per packet of the data.

18. The method of claim 16, wherein the expiry of the first timer depends on or corresponds to:

a packet delay budget (PDB) associated with the packets of the data, or a survival time associated with the packets of the data, or a latency requirement associated with the packets of the data.

19. The method of claim 16, further comprising or initiating the step of:

transmitting a control message to the first base station, the control message being indicative of at least one of initiating of the first timer, expiry of the first timer, the first trigger event, and the second trigger event.

20. A method of controlling communicating of data between a first radio device and a second radio device, the method being performed by a first base station of a radio access network (RAN) serving the first radio device and comprising or initiating the steps of:

controlling establishing a first radio communication path between the first radio device and the second radio device, wherein the first radio communication path comprises a first RAN link between the first radio device and the first base station;

controlling establishing a second radio communication path between the first radio device and the second radio device, the second radio communication path being different from the first radio communication path, wherein the second radio communication path comprises a first sidelink (SL) between the first radio device and the second radio device; and controlling communicating data between the first radio device and the second radio device by transmitting, from the first base station to the first radio device, a configuration message indicative of at least one criterion based on which the first radio device selects the first radio communication path, the second radio communication path, or both of the first and second radio communication paths for communicating the data.

21. A first radio device for communicating data between the first radio device and a second radio device, the first radio device comprising:

a processor; and a memory storing instructions that, when executed by the processor, configure the processor to control the first radio device:

establish a first radio communication path between the first radio device and the second radio device, wherein the first radio communication path comprises a first radio access network (RAN) link between the first radio device and a first base station of a RAN for serving the first radio device;

establish a second radio communication path between the first radio device and the second radio device, the second radio communication path being different from the first radio communication path, wherein the second radio communication path comprises a first sidelink (SL) between the first radio device and the second radio device;

receive a configuration message from the first base station, the configuration message being indicative of at least one criterion; and communicate data between the first radio device and the second radio device by selecting, depending on the at least one criterion, the first radio communication path, the second radio communication path, or both the first and second radio communication paths.

* * * * *